United States Patent
Wada

Patent Number: 6,064,513
Date of Patent: May 16, 2000

[54] OPTICAL TRANSMISSION SYSTEM

[75] Inventor: Tetsuo Wada, Kawasaki, Japan

[73] Assignee: Fujitsu Limited, Kanagawa, Japan

[21] Appl. No.: 08/840,509

[22] Filed: Apr. 21, 1997

[30] Foreign Application Priority Data

Nov. 18, 1996 [JP] Japan ................................. 8-306878

[51] Int. Cl.$^7$ ........................... H04J 14/02; H04B 10/02; H04B 10/16
[52] U.S. Cl. .......................... 359/337; 359/174; 359/176; 359/177
[58] Field of Search ................................... 359/124, 174, 359/176, 177, 337, 341, 348

[56] References Cited

U.S. PATENT DOCUMENTS 5,875,046  2/1999  Tamooka et al. .................. 359/174
5,877,879  3/1999  Naito ................................ 359/181

FOREIGN PATENT DOCUMENTS 10150413  6/1998  Japan .

OTHER PUBLICATIONS

Matsumura et al, 2nd Asian–Pacific Conf. of Communic., vol. 1, pp 370–374; abstract only herewith, Jun. 13, 1995.

*Primary Examiner*—Nelson Moskowitz
*Attorney, Agent, or Firm*—Helfgott & Karas, P.C.

[57] ABSTRACT

An optical transmission system having a linear repeater section that performs linear amplification of an optical signal, in which some functional redundancy is introduced to improve the reliability of long-distance signal transmission. The optical transmission line is segmented by regenerative repeater devices into a plurality of linear repeater sections, in each of which a plurality of linear optical amplifiers are deployed. The regenerative repeater devices have a signal regeneration unit that regenerates the received optical signals to compensate for their deterioration. The present invention eliminates RSOH termination and insertion functions from the regenerative repeater devices connected to at least one end of each linear repeater section. Further, the present invention deploys a signal regeneration unit in parallel with a linear optical amplifier within each linear repeater section. Still further, the present invention adds another signal regeneration unit to the existing signal regeneration unit as part of each regenerative repeater device connected to at least one end of each linear repeater section.

10 Claims, 25 Drawing Sheets

OPTICAL TRANSMISSION SYSTEM

BACKGROUND OF THE INVENTION

1. Field of the Invention

The present invention relates to optical transmission systems, and more particularly, to an optical transmission system having linear repeater sections that perform linear amplification of optical signals.

2. Description of Related Art

The advancements in optical amplification techniques using optical fiber amplifiers have enabled development of linear optical repeaters which optically amplify attenuated incoming signals and retransmit the proportionally enhanced signals to the next part of the transmission line. Optical communications systems employing such optical repeater techniques are now at the commercial stage, where the communication line is composed of a plurality of linear repeater sections each including linear optical repeaters to allow a long-distance data transmission.

FIG. 25 is a diagram showing a typical configuration of an optical communications system that uses conventional linear optical repeaters. In FIG. 25, regenerative intermediate repeaters (RST-REPs) 204, 207, and 210 are deployed between two terminal multiplex repeaters (LT-MUXs) 201 and 213, where the linear optical repeaters mentioned above are used in each section of the transmission line divided by those major repeater systems. Such sections are referred to as "linear repeater sections," each involving a predetermined number ($N_{LIM}$) of linear optical repeaters (L-REPs). More specifically, a first linear repeater section between the LT-MUX 201 and RST-REP 204 contains L-REPs 202–203, and similarly, the other three sections contain L-REPs 205–206, 208–209, and 211–212, respectively. In each linear repeater section, the cascaded L-REPs will repeatedly amplify the optical signal to overcome the effects of signal attenuation during its travel over the optical transmission line. However, this repeated linear amplification will also cause some deterioration in the signal-to-noise ratio (S/N) due to the optical noises introduced and accumulated in the amplification processes. Also, the transmission characteristics will be degraded due to the wavelength dispersion of optical signals. It is, therefore, necessary to regenerate or refresh the signal at every point where such signal quality degradation reaches a predetermined limit. The aforementioned constant $N_{LIM}$ is a critical number that is predetermined for this purpose.

The RST-REPs 204, 207, and 210 reform the optical signal waveform by what are collectively called "3R" (i.e., Reshaping, Retiming, Regenerating), and carry out termination and insertion of the Regenerator Section Over Head (RSOH) according to the Synchronous Digital Hierarchy (SDH) standards. That is, the optical transmission system of FIG. 25 is based on the SDH signal transmission scheme, where control signals are conveyed in a specific bit field called "Section Overhead (SOH)" defined as part of the SDH frame format. The RSOH is included in the SOH for use in the interactions between two repeaters or between a repeater and a terminal system. The RSOH insertion and termination processes involve several functions such as frame alignment synchronization, error monitoring, and alarm status communication.

While the optical signal regeneration is crucial at both end points of each linear repeater section, the RSOH insertion and termination are not necessarily required at every such point. However, the conventional optical transmission system shown in FIG. 25 deploys the regenerative intermediate repeaters (RST-REPs) 204, 207, and 210, in which RSOH insertion and termination functions are implemented in vain.

In the conventional optical communications system, an increased noise factor NF or any other kind of gradual performance degradation that happened to the L-REPs 202–203, 205–206, 208–209, and 211–212 would cause some bit errors (i.e., recognizing a signal "1" for "0" or vise versa) at a later receiving stage, because of deterioration in S/N ratios. To overcome the possible bit errors, some redundancy design or fault tolerant design must be introduced into the optical transmission system.

Although it may not be possible to implement fully duplexed configuration in the RST-REPs 204, 207, and 210 when some tight cost constraints are present, the demands for the more reliable regenerative repeaters still exist. To meet those demands at a low cost, it is necessary to devise some practical ways to introduce functional redundancy into the signal regeneration units that provide the signal regeneration functions.

SUMMARY OF THE INVENTION

Taking the above into consideration, an object of the present invention is to provide an optical transmission system which has a simplified configuration to reduce the cost, but provides some functional redundancy to improve the reliability of optical signal transmission.

To accomplish the above object, according to the present invention, there is provided an optical transmission system having a linear repeater section that performs linear amplification of an optical signal. The optical transmission system comprises regenerative repeater means, connected to at least one end of the linear repeater section, for regenerating the optical signal which is deteriorated, where the regenerative repeater means has no functions to terminate and insert a Regenerator Section Over Head (RSOH).

To accomplish the above object, there is provided another optical transmission system having a linear repeater section that performs linear amplification of an optical signal. This system comprises the following three structural elements. The first element is linear optical amplification means, disposed as part of the linear repeater section, for applying linear optical amplification to the optical signal that is entered thereto. The second is regenerative repeater means, disposed in parallel with the linear optical amplification means, for regenerating the optical signal. The third is wavelength-division multiplexing means for multiplexing the optical signal amplified by the linear optical amplification means and the optical signal regenerated by the regenerative repeater means in a wavelength domain to output a wavelength-division multiplexed optical signal.

To accomplish the above object, there is provided still another optical transmission system having a linear repeater section that performs linear amplification of an optical signal. This system comprises the following three structural elements. The first element is first regenerative repeater means, connected to at least one end of the linear repeater section, for producing a first optical signal by regenerating an optical signal that is entered thereto and performing RSOH termination and insertion. The second is second regenerative repeater means, disposed in parallel with the first regenerative repeater means, for producing a second optical signal by regenerating the optical signal that is entered. The third is wavelength-division multiplexing means for multiplexing the first optical signal produced by the first regenerative repeater means and the second optical signal produced by the regenerative repeater means in a wavelength domain to output a wavelength-division multiplexed optical signal.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Seven embodiments of the present invention will be described below with reference to the accompanying drawings.

Figure 1:
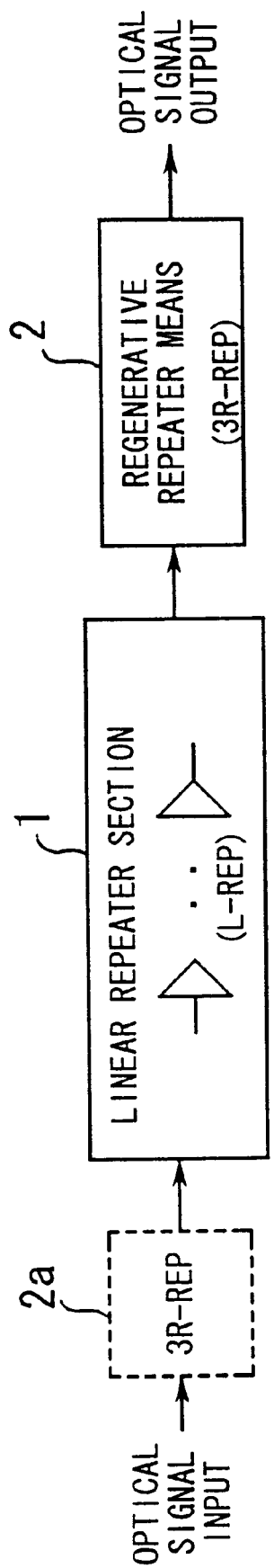
FIG. 1 is a first conceptual view of the present invention.

Referring first to FIG. 1, the following will explain the concept of a first embodiment of the present invention. This first embodiment proposes an optical transmission system having a linear repeater section 1 that performs linear amplification of an optical signal that is entered thereto. This proposed system comprises regenerative repeater means 2 connected to at least one end of the linear repeater section 1 for regenerating the optical signal which is deteriorated, where in the regenerative repeater means has no functions to terminate and insert a Regenerator Section Over Head (RSOH). In FIG. 1, another regenerative repeater 2a is an optional regenerative repeater means which can be disposed at the other end of the linear repeater section 1.

In the above-described structure, the RSOH termination and insertion are eliminated at one end point of the linear repeater section 1 where those processes are not required, while only the regenerative repeater means 2 is disposed at that end to regenerate the attenuated and deteriorated optical signal. This elimination of unused structural elements will reduce the cost of the optical communication system.

Referring next to FIGS. 4–9, the following will describe the detailed structure of the first embodiment, in which the regenerative repeater means 2 shown in FIG. 1 is implemented as regenerative optical repeaters (3R-REP) 12 and 14.

Figure 4:
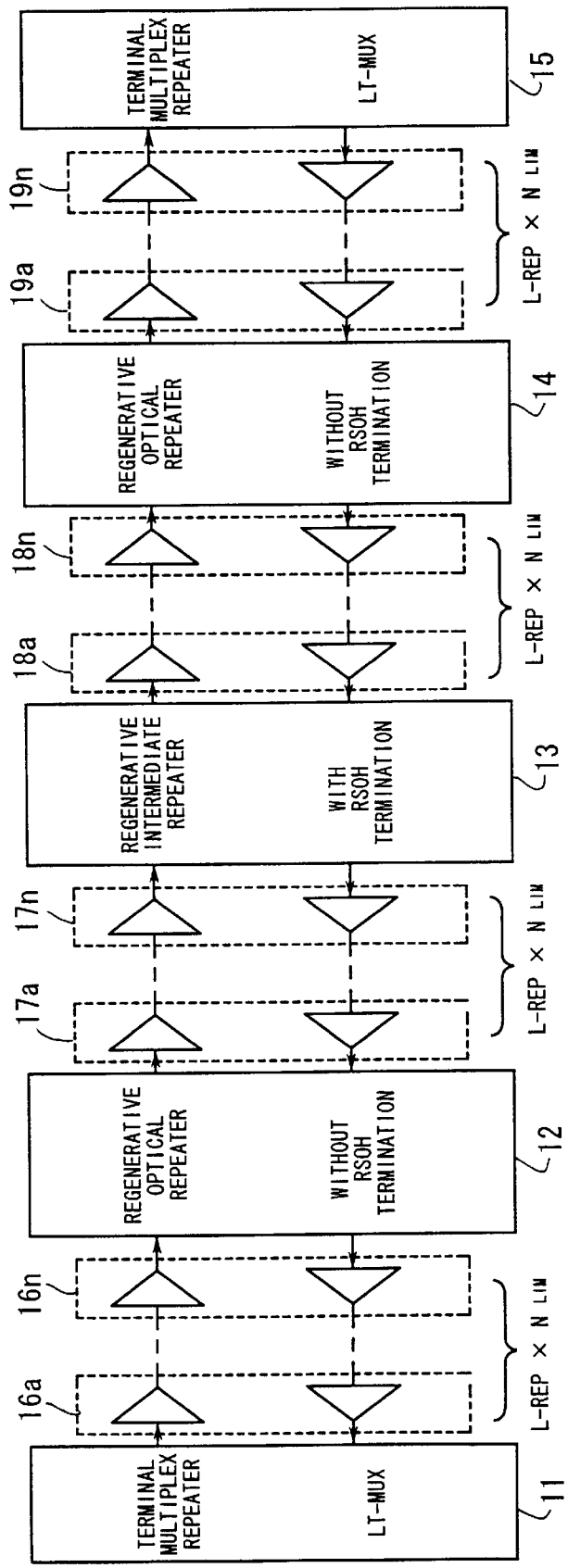
FIG. 4 is a diagram showing the structure of an optical communications system proposed in a first embodiment of the present invention.

FIG. 4 shows the structure of the proposed optical communications system of the first embodiment. In FIG. 4, a regenerative optical repeater (3R-REP) 12, a regenerative intermediate repeater (RST-REP) 13, and another regenerative optical repeater (3R-REP) 14 are deployed between two terminal multiplex repeaters (LT-MUXs) 11 and 15. Those regenerative repeaters are connected in series via linear repeater sections, each of which is constructed by a predetermined number ($N_{LIM}$) of linear optical repeaters such as L-REPs 16a–16n, 17a–17n, 18a–18n, and 19a–19n. Those cascaded L-REPs in each section repeatedly applies linear amplification to the optical signal to overcome the effects of signal attenuation during its travel along the transmission media. This repeated amplification, however, will cause some deterioration in the signal-to-noise ratio (S/N) due to some optical noises introduced in the amplification processes. The optical transmission characteristics will also be degraded due to the wavelength dispersion of optical signals. Therefore, the number $N_{LIM}$ of L-REPs being placed along the transmission line of each linear repeater section is determined so that the degradation in S/N ratios and transmission characteristics be within their respective predetermined tolerances.

Figure 5:
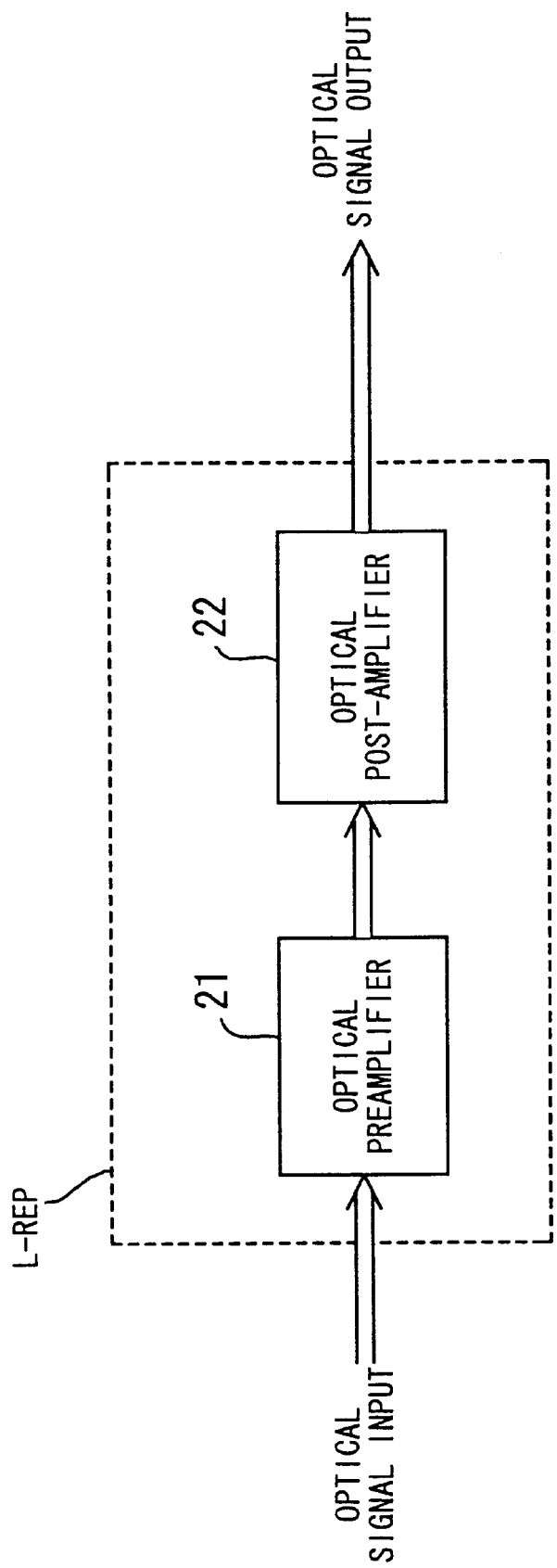
FIG. 5 is a diagram showing the internal structure of a linear optical repeater (L-REP)

FIG. 5 is a diagram showing the internal structure of the L-REP that is used in the optical transmission system of FIG. 4. This FIG. 5 depicts only one L-REP unit since all the L-REPs 16a–16n, 17a–17n, 18a–18n, and 19a–19n have the same structure.

Although the L-REP is actually composed of a main signal processing unit, a monitoring control unit, a power feeding unit and the like, FIG. 5 shows the main signal processing unit only. The main signal processing unit comprises an optical preamplifier 21 for low-noise amplification and an optical post-amplifier 22 for further power amplification. The L-REP internally produces some small noise signals whose power is expressed by a noise factor NF.

Figure 6:
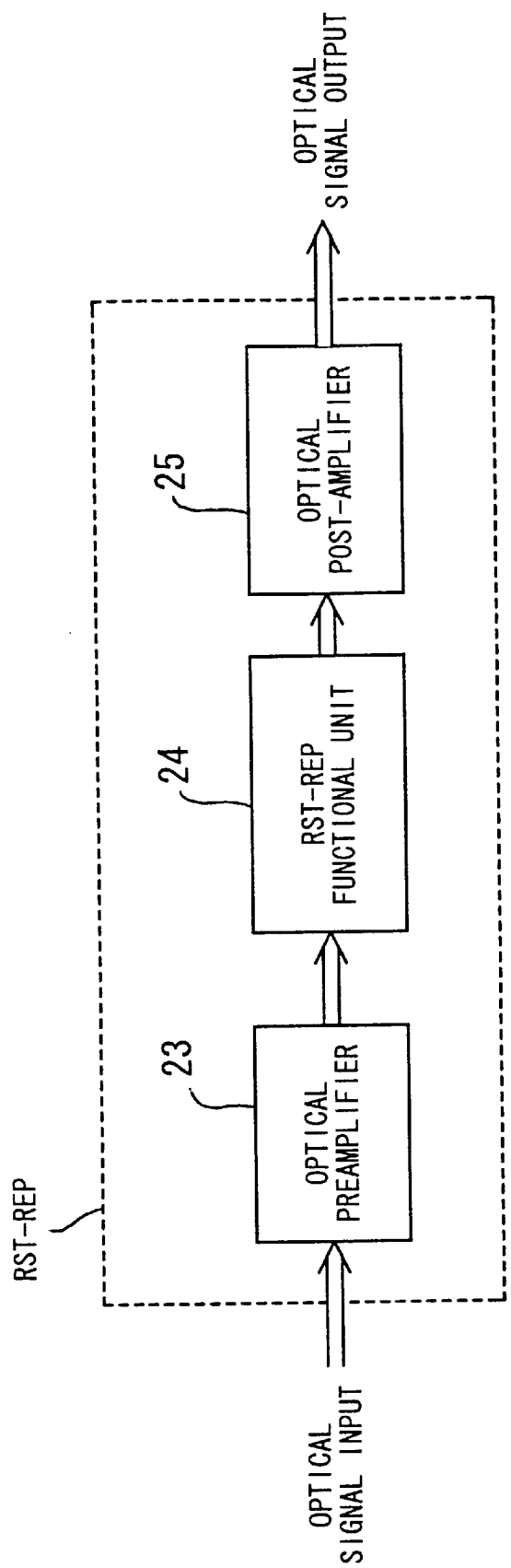
FIG. 6 is a diagram showing the internal structure of a regenerative intermediate repeater (RST-REP)

FIG. 6 shows the internal structure of the RST-REP 13. Similar to the L-REP, the RST-REP 13 is actually composed of a main signal processing unit, a monitoring control unit, a power feeding unit and the like. FIG. 6, however, focuses on the main signal processing unit. The main signal processing unit of the RST-REP 13 comprises an optical preamplifier 23, an RST-REP functional unit 24, and an optical post-amplifier 25. The optical preamplifier 23 and optical post-amplifier 25 provide the same functions as those of the optical preamplifier 21 and optical post-amplifier 22 in the L-REP. The RST-REP functional unit 24 conducts RSOH termination and insertion, as well as performing regeneration of the optical signal to compensate for its deterioration. More detailed structure of this RST-REP functional unit 24 will be explained below with reference to FIG. 7.

Figure 7:
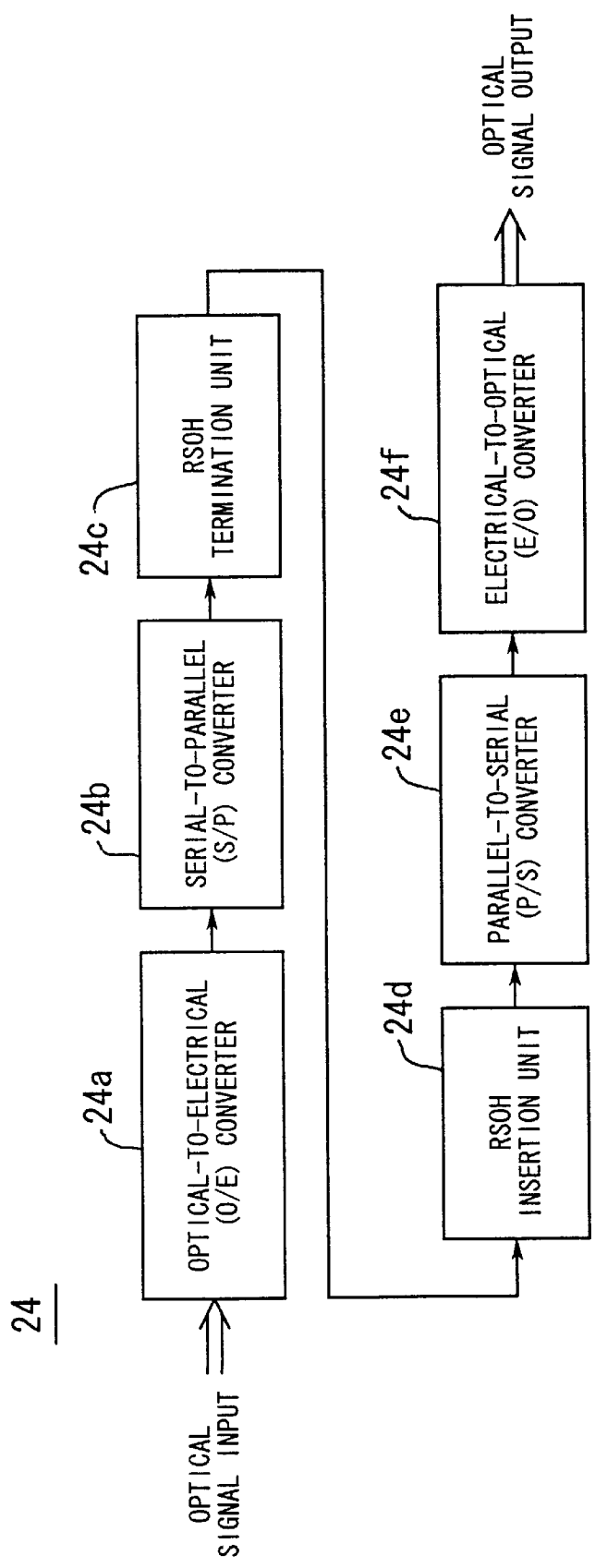
FIG. 7 is a diagram showing the internal structure of an RST-REP functional unit.

FIG. 7 shows the internal structure of the RST-REP functional unit 24. First, an optical-to-electrical (O/E) converter 24a converts an incoming optical signal to an electrical signal. Three signal regeneration processes (3R: Reshaping, Retiming, Regenerating) are primarily involved in this O/E conversion stage. Then a serial-to-parallel (S/P) converter 24b rearranges a serial bit stream to parallel data to allow the later stages to process the signals at lower speeds. After that, an RSOH termination unit 24c and RSOH insertion unit 24d execute the RSOH termination and insertion processes, respectively. Then a parallel-to-serial (P/S) converter 24e and electrical-to-optical (E/O) converter 24f respectively perform the inverse of the signal conversions done by the S/P converter 24b and O/E converter 24a.

Figure 8:
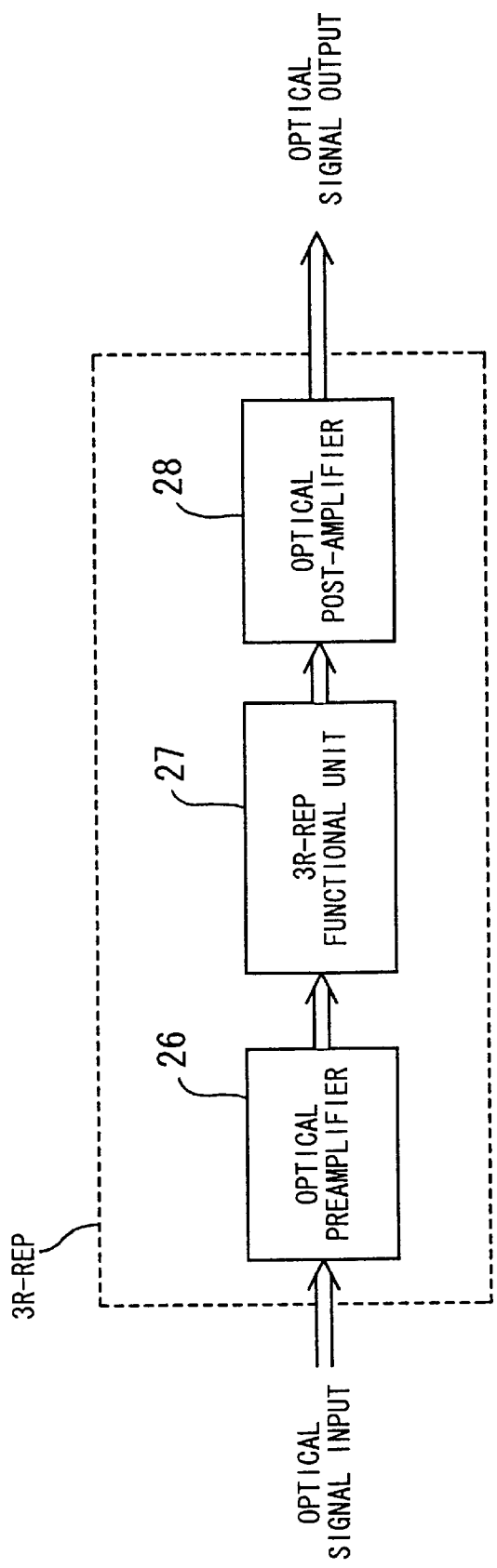
FIG. 8 is a diagram showing the internal structure of a regenerative optical repeater (3R-REP)

Next, FIG. 8 shows the internal structure of a regenerative optical repeater (3R-REP). This FIG. 8 presents only one repeater device since both 3R-REPs 12 and 14 comprise the same structure.

As is the case with the other two types of repeaters described earlier, the 3R-REP is also composed of a main signal processing unit, a monitoring control unit, a power feeding unit and the like. FIG. 8, however, focuses on the main signal processing unit.

The main signal processing unit comprises an optical preamplifier 26, a 3R-REP functional unit 27, and an optical post-amplifier 28. The optical preamplifier 26 and optical post-amplifier 28 provide the same functions as those of the optical preamplifier 21 and optical post-amplifier 22 as part of the L-REP shown in FIG. 5.

Figure 9:
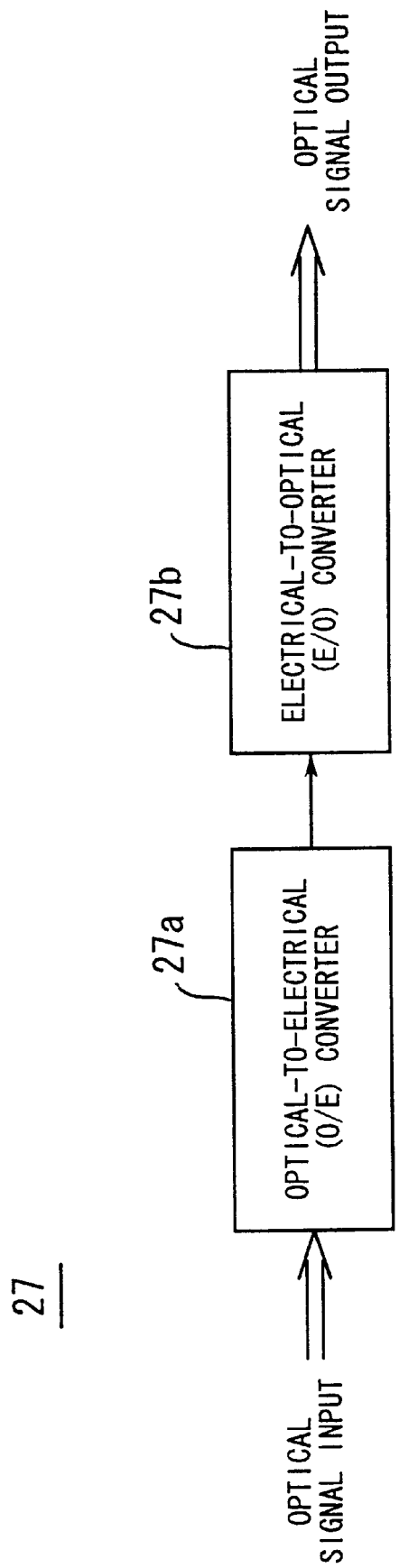
FIG. 9 is a diagram showing the internal structure of a 3R-REP functional unit.

FIG. 9 shows the internal structure of the 3R-REP functional unit 27. In this FIG. 9, an O/E converter 27a converts an incoming optical signal to an electrical signal, where three kinds of signal regeneration processes (3R) are implemented. The regenerated electrical signal is reconverted to an optical signal by an E/O converter 27b.

As described above, the optical transmission system of the first embodiment employs not an RST-REP but a 3R-REP at the end of a linear repeater section, if no RSOH termination and insertion functions are required there. In contrast to the RST-REP functional unit shown in FIG. 7, the 3R-REP functional unit of FIG. 9 has much simple structure and thus contributes to the total cost reduction of the optical transmission system. In addition, the reliability of the system will also be improved because of elimination of unused functions.

Figure 2:
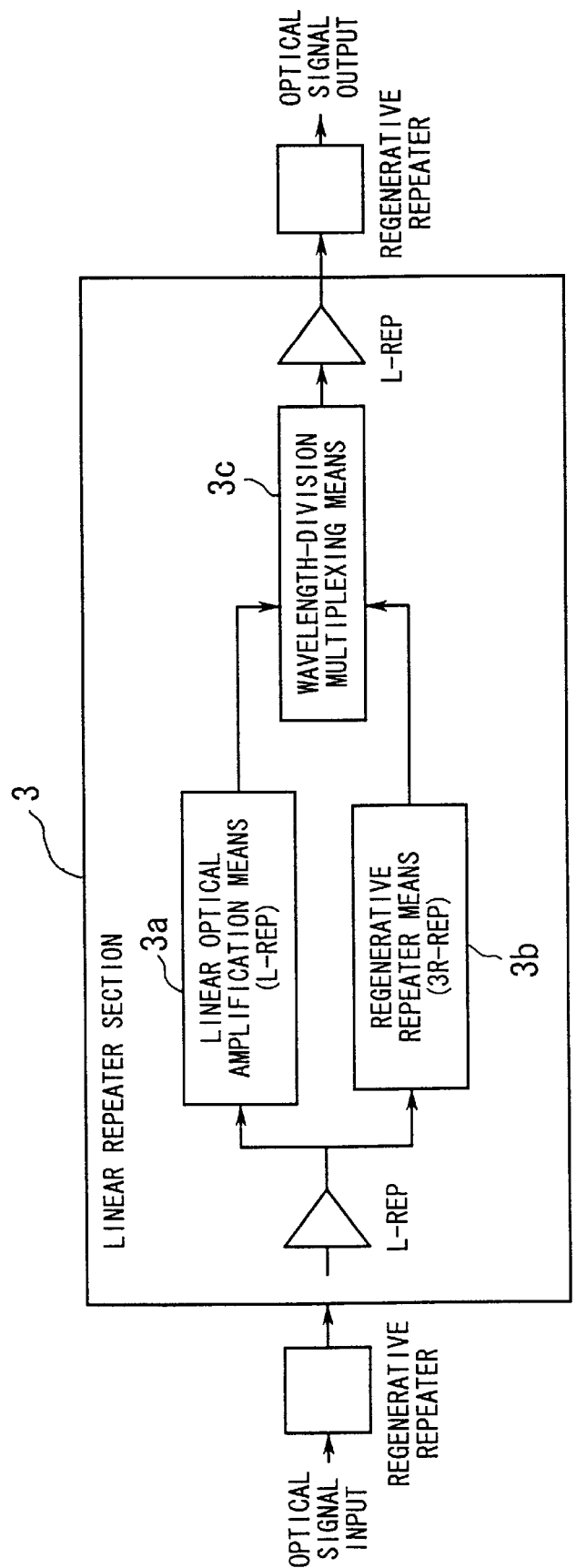
FIG. 2 is a second conceptual view of the present invention.

Referring next to FIG. 2, a second embodiment of the present invention will be outlined below.

FIG. 2 shows the concept of the second embodiment. The second embodiment proposes another configuration of an optical transmission system, in which a linear repeater section 3 performs linear amplification of an incoming optical signal. This proposed system comprises the following three structural elements. The first element is linear optical amplification means 3a disposed as part of the linear repeater section 3 for applying linear optical amplification to the optical signal that is entered thereto. The second element is regenerative repeater means 3b disposed in parallel with the linear optical amplification means 3a for regenerating the optical signal. The third is wavelength-division multiplexing means 3c for multiplexing the optical signal amplified by the linear optical amplification means 3a and the optical signal regenerated by the regenerative repeater means 3b in the wavelength domain to output a wavelength-division multiplexed optical signal.

This second embodiment differs from conventional systems in that it employs the regenerative repeater means 3b and wavelength-division multiplexing means 3c in addition to the linear optical amplification means 3a (L-REP). In the linear repeater section 3, some gradual deterioration, such as increased noise factor NF, may occur in any linear optical amplifiers including the linear optical amplification means 3a. However, thanks to its functions to reform the transmission signal, the regenerative repeater means 3b will compensate for the deterioration, and the later stages can use the compensated signal by selecting it. This configuration will thus promise the improvement in the reliability of the optical communications system.

The following will present the detailed structure of the second embodiment with reference to FIGS. 10–14. The relationships between the conceptual elements explained in FIG. 2 and their actual implementations shown in FIGS. 10–14 will be summarized at the end of the following discussion.

Figure 10:
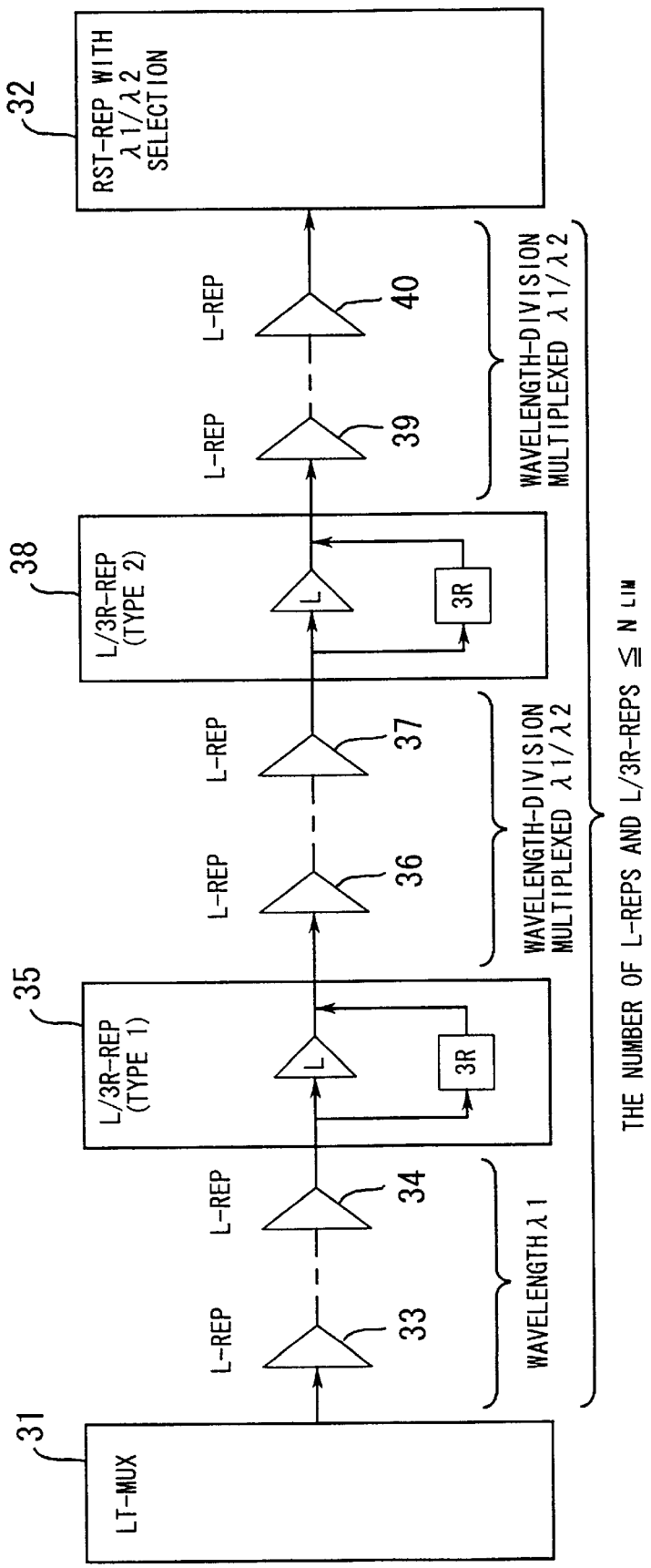
FIG. 10 is a diagram showing the structure of an optical communications system proposed in a second embodiment of the present invention.

FIG. 10 shows the structure of an optical communications system proposed in the second embodiment of the present invention. This system has a linear repeater section linking a terminal multiplex repeater (LT-MUX) 31 and an RST-REP 32. The linear repeater section comprises a plurality of repeaters including: L-REPs 33–34, a repeater (L/3R-REP type 1) 35, L-REPs 36–37, another kind of repeater (L/3R-REP type 2) 38, and L-REPs 39–40. The L/3R-REP 35 and L/3R-REP 38, as will be described in detail later on, are devices each containing both L-REP and 3R-REP functions just in parallel.

The total number of repeaters that form the linear repeater section (i.e., the L-REPs 33–34, L/3R-REP 35, L-REPs 36–37, L/3R-REP 38, and L-REPs 39–40) must not be greater than a predetermined number $N_{LIM}$. As mentioned in the first embodiment, the signals passing through the linear repeater section may be deteriorated in signal-to-noise ratio (S/N) due to some optical noises introduced in the optical amplification processes. Transmission characteristics of the optical signals may also be degraded due to their wavelength dispersion. The number $N_{LIM}$ is determined so that such signal quality degradation will not exceed a predetermined tolerance level. The L-REPs 33–34 repeats an optical signal with a wavelength $\lambda 1$, while the other L-REPs 36–37, L/3R-REP 38, and L-REPs 39–40 relay multiplexed optical signals with two different wavelengths $\lambda 1$ and $\lambda 2$ as will be clarified later.

The L-REPs 33–34, 36–37 and 39–40 have the same internal structure as that of the L-REP in the first embodiment shown in FIG. 5. As an alternate configuration, the LT-MUX 31 can be replaced with an RST-REP or 3R-REP and, in turn, an LT-MUX can substitute for the RST-REP 32. Note, however, that this RST-REP 32 has a function to select either one of the two optical signals with wavelengths $\lambda 1$ and $\lambda 2$, as will be illustrated later in FIG. 13.

Figure 11:
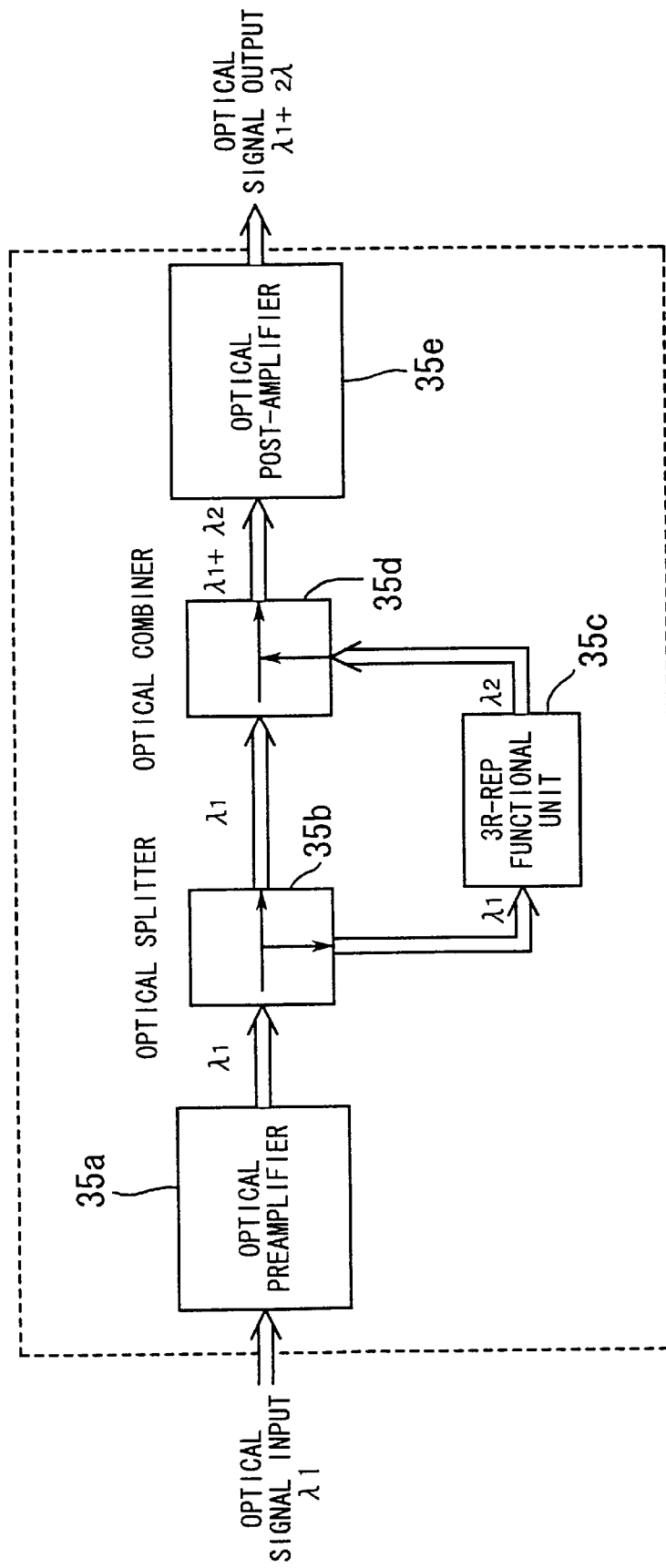
FIG. 11 is a diagram showing the internal structure of an L/3R-REP.

FIG. 11 shows the internal structure of the L/3R-REP unit 35. An optical preamplifier 35a is a low-noise amplifier designed to amplify an optical signal with a wavelength $\lambda 1$ entered thereto. The amplified optical signal is split into two parts by an optical splitter 35b, and one part is sent to a 3R-REP functional unit 35c. Here, the deterioration of the optical signal is compensated for by signal regeneration that is performed by the 3R-REP functional unit 35c, whose the internal structure is almost the same as that of the 3R-REP functional unit illustrated in FIG. 9 as part the first embodiment of the present invention. It should be noted that the regenerated signal will have a different wavelength $\lambda 2$ which is converted from the original wavelength $\lambda 1$. The optical combiner 35d combines the optical signal with the wavelength $\lambda 1$ sent from the optical splitter 35b and the regenerated optical signal with the wavelength $\lambda 2$ sent from the 3R-REP functional unit 35c, thereby multiplexing the two signals in the wavelength domain. These wavelength-division multiplexed signals are then delivered to an optical post-amplifier 35e for further power amplification.

Figure 12:
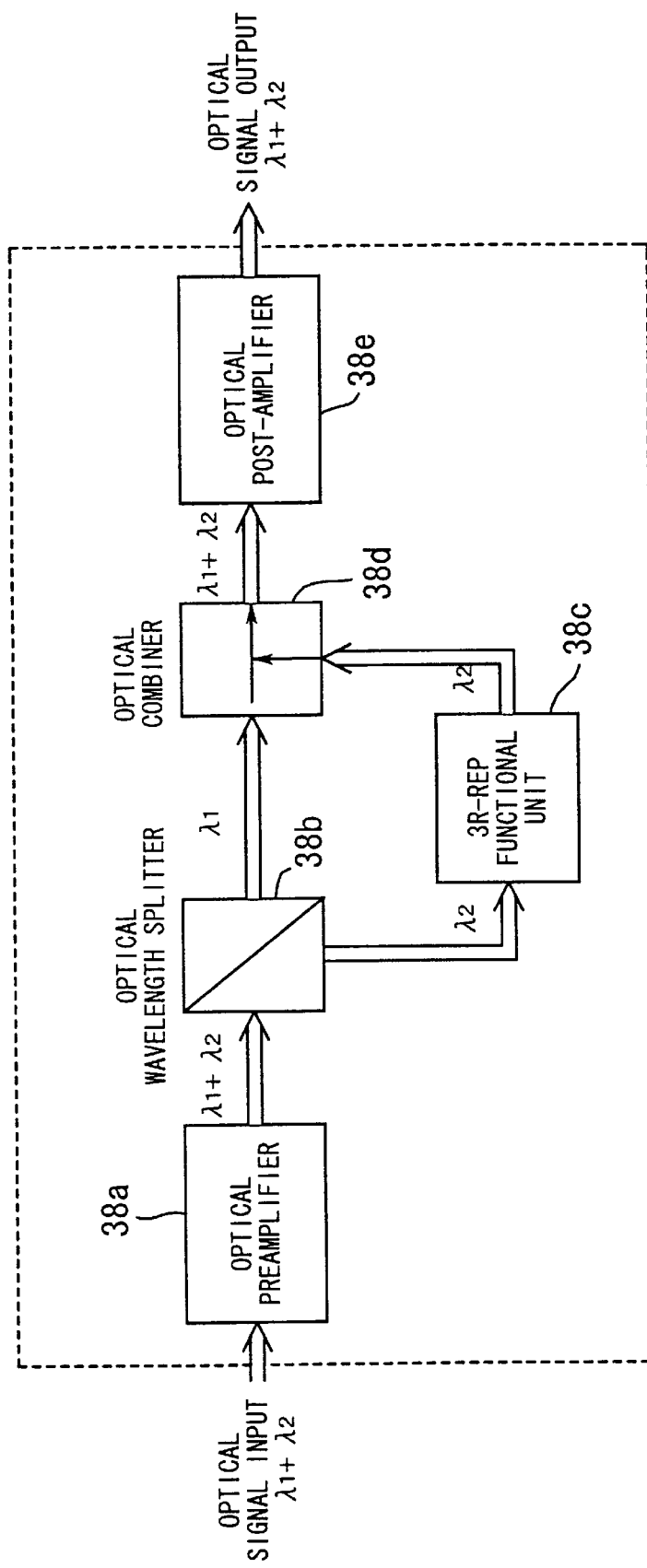
FIG. 12 is another diagram showing the internal structure of another type of L/3R-REP.

FIG. 12 is a diagram showing the internal structure of the L/3R-REP 38. A single light beam containing two optical signals with the wavelengths $\lambda 1$ and $\lambda 2$ is entered to an optical preamplifier 38a, which is a low-noise amplifier designed to amplify those wavelength-division multiplexed signals. The optical wavelength splitter 38b splits the multiplexed optical signals into individual signals having the wavelengths $\lambda 1$ and $\lambda 2$, respectively.

Here, the signal with the wavelength $\lambda 2$ is split off and sent to a 3R-REP functional unit 38c. This optical signal, which may be deteriorated, is refreshed by the 3R-REP functional unit 38c, which has the same internal structure as that of the 3R-REP illustrated in FIG. 9 as part the first embodiment of the present invention. Note that the output wavelength $\lambda 2$ is maintained in the signal regeneration process. The optical combiner 38d recombines the optical signal with the wavelength $\lambda 1$ sent from the optical splitter 38b and the regenerated optical signal with the wavelength $\lambda 2$ sent from the 3R-REP functional unit 38c, thereby multiplexing again the two signals in the wavelength domain. The resultant wavelength-multiplexed signal is then delivered to an optical post-amplifier 38e to further boost the power of the optical signal.

Assume here that some gradual signal degradation such as increased noise factor NF happened to any of the L-REPs 33–34, 36–37 and 39–40. It would degrade the S/N ratio and cause some bit errors in the optical signal with the wavelength $\lambda 1$ to be detected at a later stage. However, in the linear repeater section according to the present invention, the L/3R-REPs 35 and 38 are installed in place of conventional L-REPs, and the deteriorated signals will be regenerated by the 3R-REP functional unit 35c in the L/3R-REP 35 as well as in the 3R-REP functional unit 38c in the L/3R-REP 38. It is therefore possible for the later stages to receive the optical signals without errors by selecting the wavelength $\lambda 2$ as will be described later with reference to FIG. 13. The probability of such errors in the optical signal will be decreased as the transmission system is equipped with many L/3R-REPs instead of the conventional L-REPs. The L/3R-REPs 35 and 38 are expected to provide the same effects on the optical signal errors deriving from wavelength dispersion.

Figure 13:
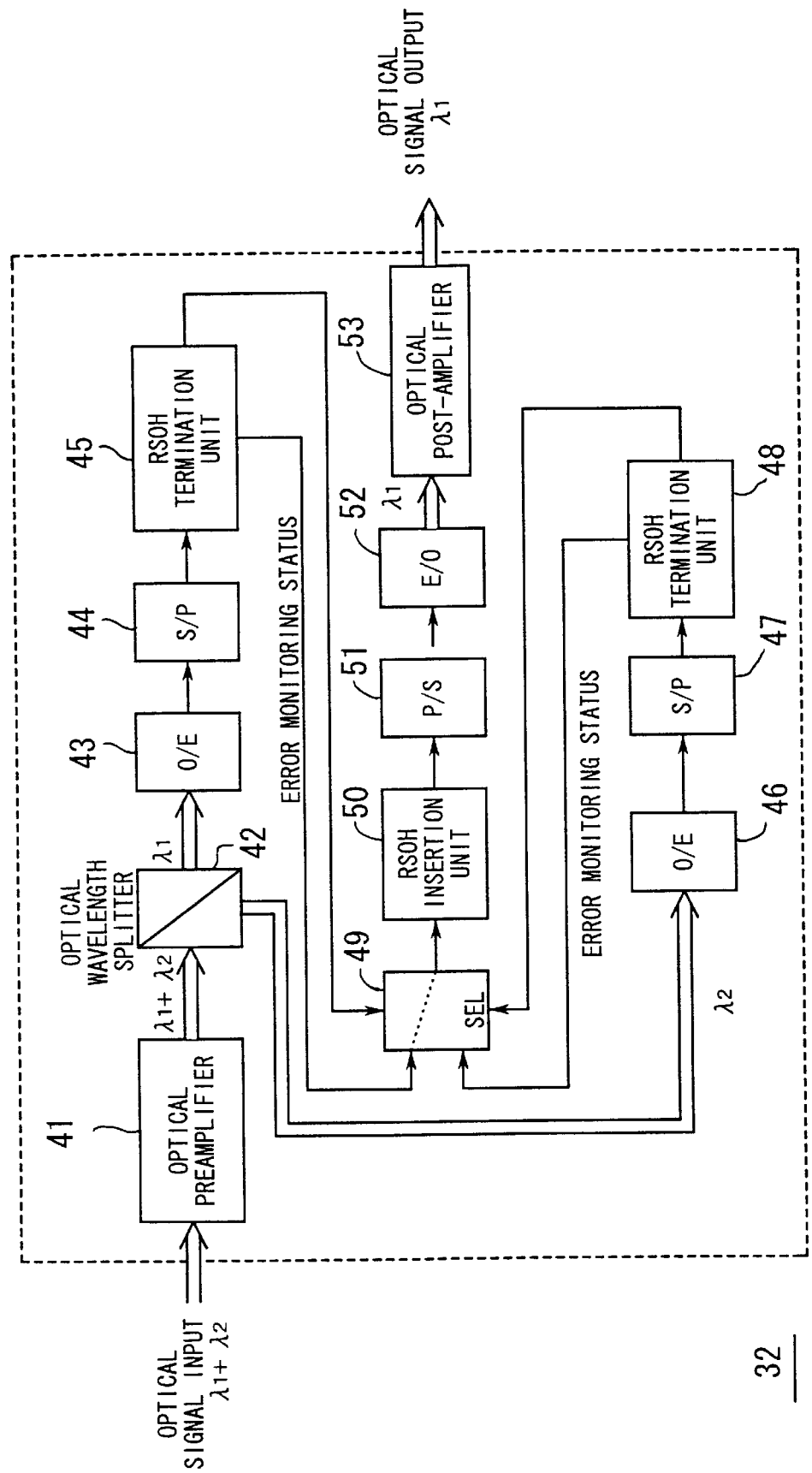
FIG. 13 is a diagram showing the internal structure of an RST-REP functional unit having a function to select one of two wavelengths $\lambda 1$ and $\lambda 2$.

FIG. 13 shows the internal structure of the RST-REP 32, which has a function to select one of the wavelengths $\lambda 1$ and $\lambda 2$. More specifically, a single light beam containing two optical signal components with the wavelengths $\lambda 1$ and $\lambda 2$ is entered to an optical preamplifier 41 which is a low-noise amplifier to amplify those wavelength-division multiplexed signals. The optical wavelength splitter 42 separates the wavelength-multiplexed signals into two individual optical signals having different wavelengths $\lambda 1$ and $\lambda 2$, respectively. The signal with the wavelength $\lambda 1$ is then sent to an optical-electrical (O/E) converter 43, while the other signal with the wavelength $\lambda 2$ is delivered to another O/E converter 46.

The O/E converter 43 converts the optical signal with the wavelength $\lambda 1$ to an electrical signal, as well as regenerating the signal to compensate for the deterioration due to the optical noises and wavelength dispersion. A serial-to-parallel (S/P) converter 44 converts the serial bit stream to parallel data, and an RSOH termination unit 45 performs termination of the RSOH contained in each SDH frame. In this RSOH termination process, the RSOH termination unit 45 extracts error status information included therein and sends it to a selector 49 along with the RSOH-terminated data signal.

Similarly, the O/E converter 46 converts the optical signal with the wavelength $\lambda 2$ to an electrical signal, as well as regenerating the signal deteriorated due to the optical noises and wavelength dispersion. An S/P converter 47 converts the serial bit stream into parallel data, and an RSOH termination unit 48 performs termination of the RSOH in each SDH frame, where the error status information is extracted and sent to a selector 49 together with the RSOH-terminated data signal.

Out of the two RSOH-terminated data signals received from the RSOH termination units 45 and 48, the selector 49 chooses one signal having no error indication and sends it to an RSOH insertion unit 50. The selector 49 makes this selection based on the error status signals provided by the RSOH termination units 45 and 48. When there is no error in the both waves, the data transmitted over the optical signal with the wavelength $\lambda 1$ will be selected. When, in turn, any error is found in the wave $\lambda 1$, the data transmitted over the optical signal with the wavelength $\lambda 2$ will be selected. FIG. 13 shows the former case where no error is found and thus the data transmitted over the optical signal with the wavelength $\lambda 1$ is selected and supplied to the next stage, or an RSOH insertion unit 50.

The RSOH insertion unit 50 executes an RSOH insertion process, and subsequently, a P/S converter 51 converts the parallel data to a serial bit stream. An E/O converter 52 performs an electronic-to-optical signal conversion to output an optical signal. An optical post-amplifier 53 amplifies the optical signal up to a certain power level.

Figure 14:
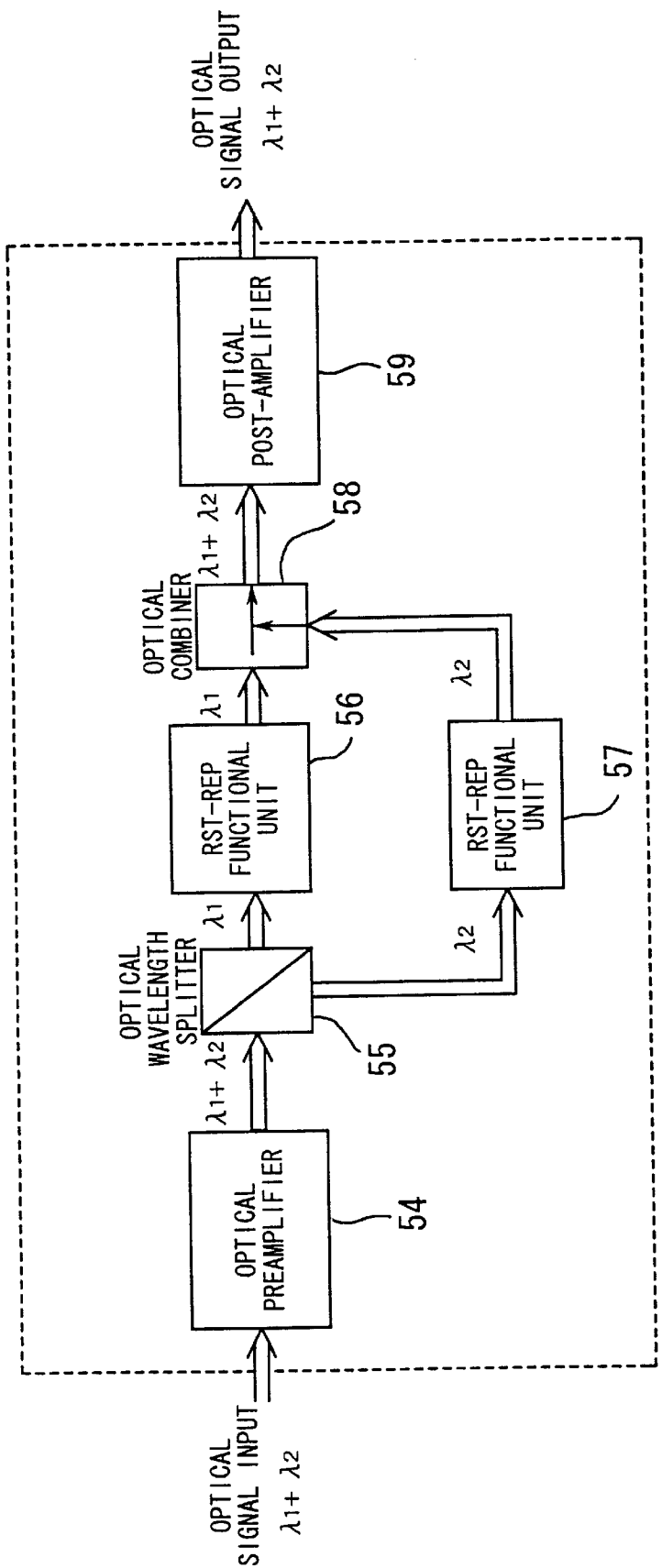
FIG. 14 is a diagram showing the internal structure of an RST-REP functional unit that lacks the function to select one of two wavelengths $\lambda 1$ and $\lambda 2$.

This type of RST-REP equipped with the above-described wavelength selection function, however, is not necessarily deployed at every linear repeater section. Rather, the wavelength selection is only required at the last receiving-end equipment such as an LT-MUX. Referring next to FIG. 14, the following will introduce an RST-REP without the wavelength selection function.

FIG. 14 is a diagram showing the internal structure of an RST-REP unit without the function to select one of two wavelengths, $\lambda 1$ or $\lambda 2$. The wavelength-multiplexed optical signals containing two wavelengths $\lambda 1$ and $\lambda 2$ are entered to a low-noise optical preamplifier 54 to gain their amplitude. The optical wavelength splitter 55 demultiplexes the wavelength-multiplexed signals into two individual optical signals respectively having wavelengths $\lambda 1$ and $\lambda 2$. The signal with the wavelength λ1 is then sent to an RST-REP functional unit 56, while the other signal with the wavelength λ2 is sent to another RST-REP functional unit 57. Having the same structure as that of the RST-REP functional unit 24 of the first embodiment explained in FIG. 7, the RST-REP functional units 56 and 57 will individually perform the signal regeneration, RSOH termination, and RSOH insertion, thereby reproducing two light beams having different wavelengths λ1 and λ2. An optical combiner 58 combines them into a single light beam by using a wavelength-division multiplexing technique, and an optical post-amplifier 59 further amplifies it to a higher power level.

As described above, the second embodiment of the present invention employs a 3R-REP in parallel with an L-REP at every few L-REP stages within a linear repeater section as illustrated in FIG. 10, which makes the system partially duplexed. The 3R-REPs provide signal regeneration functions, and the higher-quality signal transported through the 3R-REPs can be selected at a later stage if required. It is therefore possible to overcome the signal deterioration even if it happened to the optical transmission signal due to some gradual degradation of noise factor NF or the like. Such functional duplexity and use of signal regeneration will improve the reliability of the optical communications system.

The essential elements of the second embodiment depicted in FIG. 2 are actually implemented in the L/3R-REPs 35 and 38 as follows. The linear optical amplification means 3a in FIG. 2 corresponds to the optical preamplifier 35a and optical post-amplifier 35e in FIG. 11 or to the optical preamplifier 38a and optical post-amplifier 38e in FIG. 12. Likewise, the regenerative repeater means 3b corresponds to the 3R-REP functional unit 35c in FIG. 11 or 38c in FIG. 12, and the wavelength-division multiplexing means 3c corresponds to the optical combiner 35d in FIG. 11 or 38d in FIG. 12.

Next, the following description will present a third embodiment of the present invention.

First, the concept of the third embodiment will be explained, referring back to FIG. 3. The third embodiment proposes still another optical transmission system which comprises the following three structural elements. The first element is first regenerative repeater means 5, connected to at least one end of a linear repeater section 4, for producing a first optical signal by regenerating an optical signal that is entered thereto and performing RSOH termination and insertion. The second element is second regenerative repeater means 6, disposed in parallel with the first regenerative repeater means 5, for producing a second optical signal by regenerating the optical signal that is entered. The third element is wavelength-division multiplexing means 7 for multiplexing the first optical signal produced by the first regenerative repeater means 5 and the second optical signal produced by the regenerative repeater means 6 in the wavelength domain to output wavelength-division multiplexed optical signals.

This third embodiment is distinctive in that it employs the second regenerative repeater means (3R-REP) 6 and wavelength-division multiplexing means 7 in addition to the first regenerative repeater means 5 (RST-REP) at one end or both ends of each linear repeater section. The second regenerative repeater means 6 provides signal regeneration functions, and the signals produced in this second regenerative repeater means 6 can be selected at a later stage if necessary. Although the RSOH termination and insertion are not supported, the repeater can continue to provide a clear regenerated signal via this additional channel, even if the first regenerative repeater means 5 failed due to some troubles. This configuration realizes some functional redundancy at a lower cost, thus improving the reliability of the optical transmission system.

Figure 3:
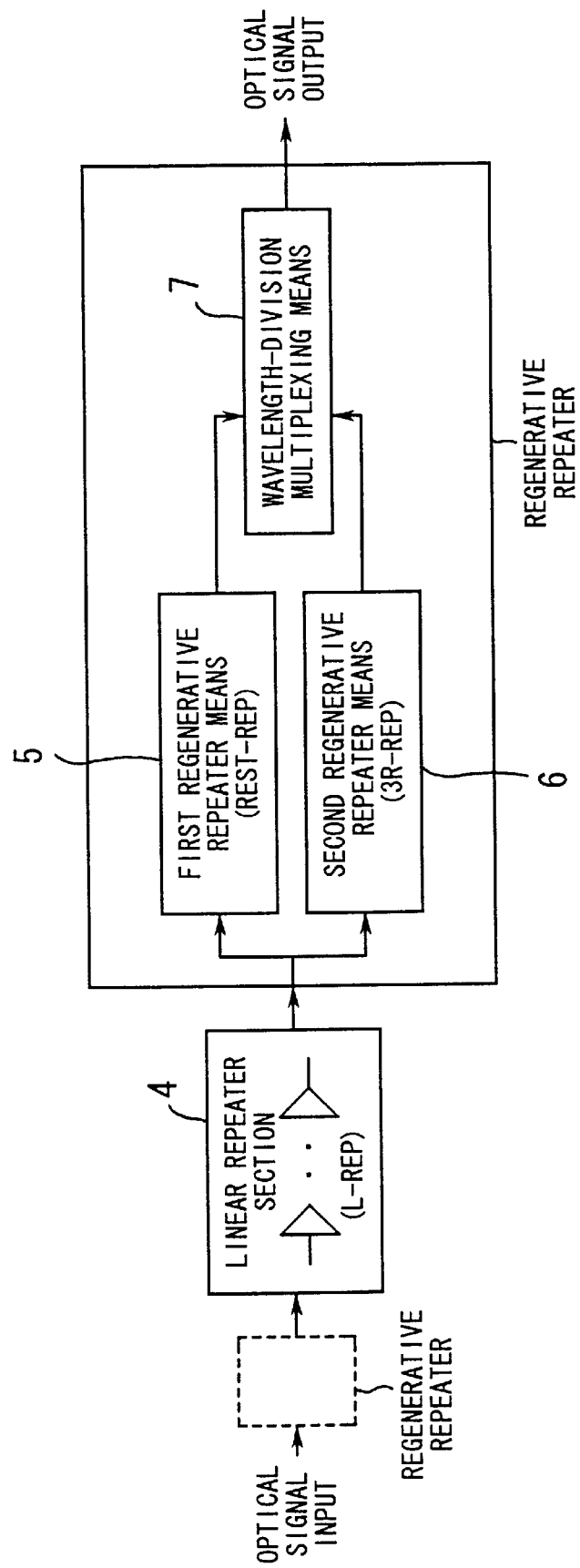
FIG. 3 is a third conceptual view of the present invention.
Figure 15:
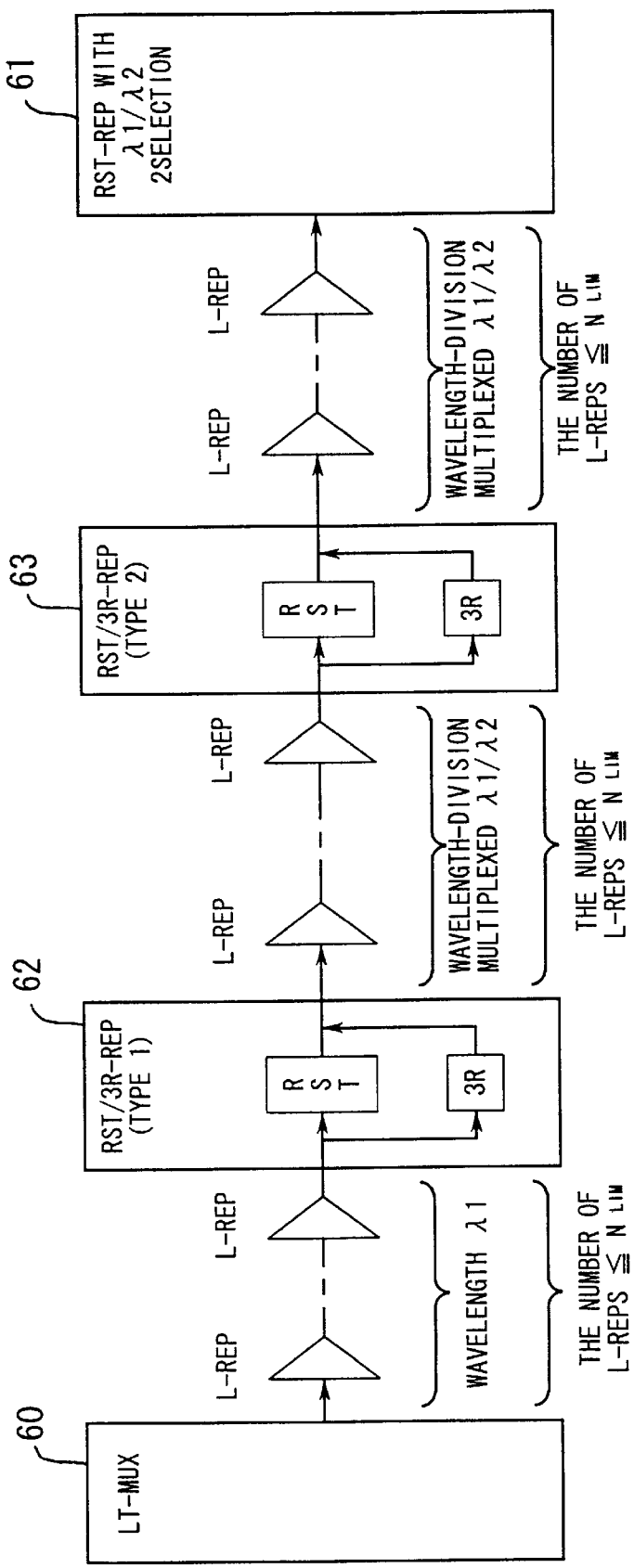
FIG. 15 is a diagram showing the structure of an optical communications system proposed in a third embodiment of the present invention.
Figure 16:
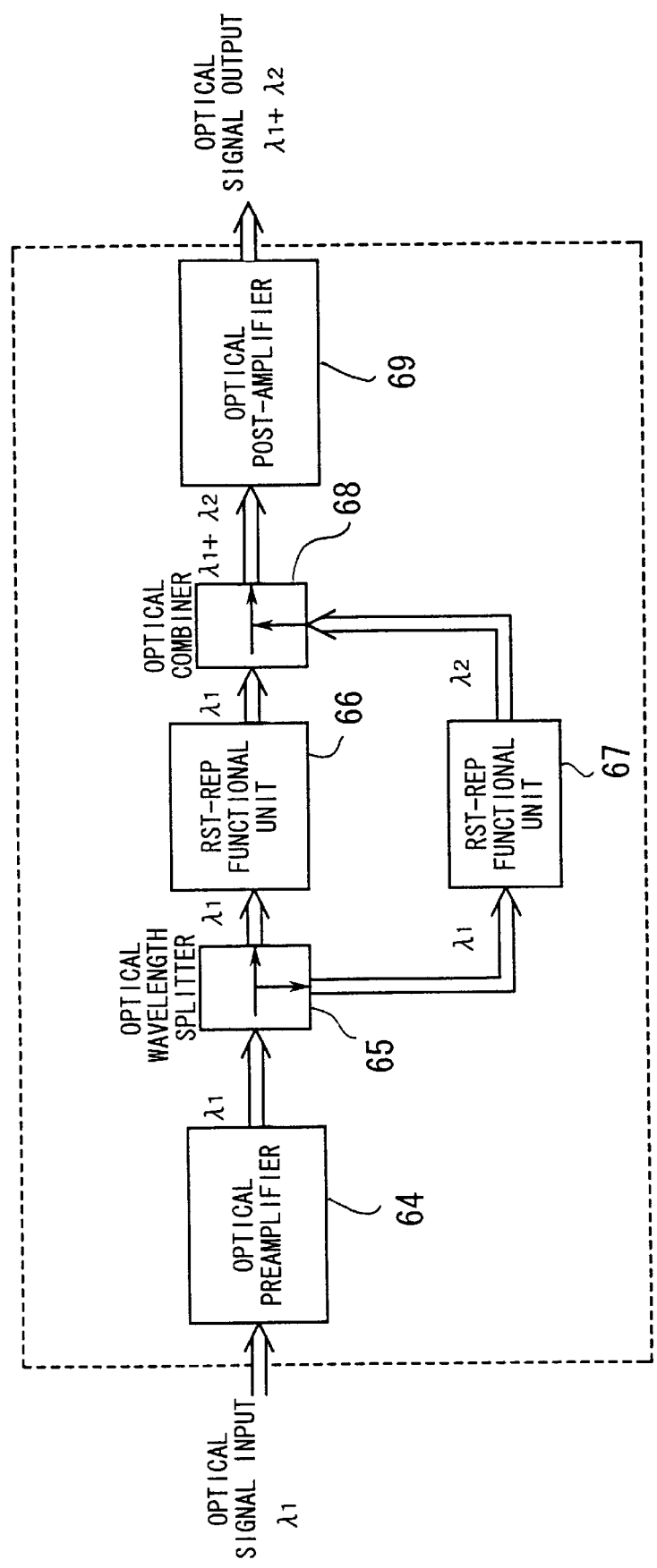
FIG. 16 is a diagram showing the internal structure of a regenerative repeater (RST/3R-REP)
Figure 17:
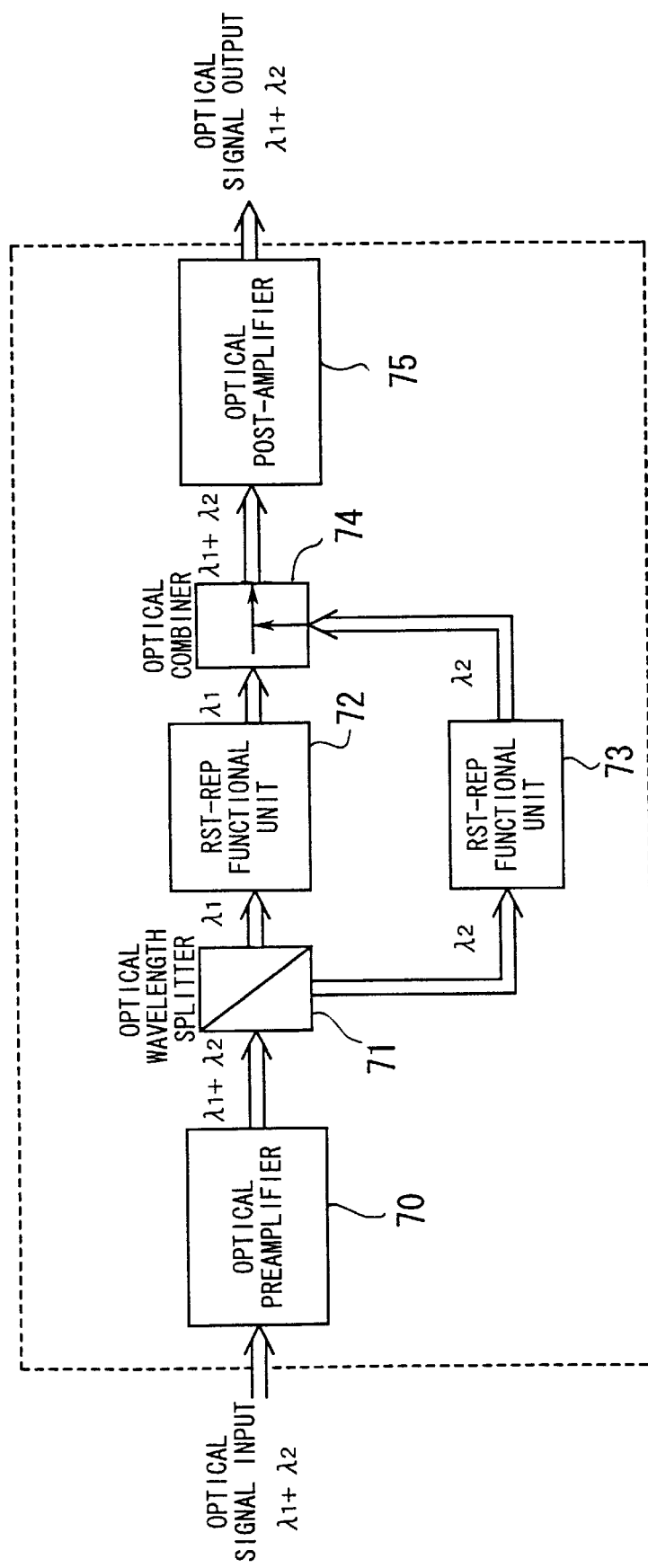
FIG. 17 is another diagram showing the internal structure of the RST/3R-REP.

Referring next to FIGS. 15–17, the following description will present the detailed structure of the third embodiment of the present invention. While the fundamental structure explained in FIG. 3 is associated with the structure shown in FIGS. 15–17, their relationship will be summarized at the end of the following description.

FIG. 15 shows the structure of an optical communications system proposed in the third embodiment. In FIG. 15, regenerative repeaters (RST/3R-REPs) 62 and 63 are deployed between a terminal multiplex repeater (LT-MUX) 60 and a regenerative repeater (RST-REP) 61, where three linear repeater sections composed of linear repeaters (L-REPs) connect those regenerative repeater devices in series. The number of L-REPs included in each linear repeater section is not greater than the predetermined number $N_{LIM}$ that is discussed in the first embodiment. The first linear repeater section lying between the LT-MUX 60 and regenerative repeater (RST/3R-REP) 62 conveys a single optical signal with a wavelength λ1, while the second and third linear repeater sections between the regenerative repeater (RST/3R-REP) 62 and RST-REP 61 transmit wavelength-division multiplexed signals including two different wavelength components λ1 and λ2. The L-REPs have the same internal structure as the L-REP described in the first embodiment in FIG. 5. As alternate configurations, an RST-REP or 3R-REP can placed instead of the LT-MUX 60, and an LT-MUX may be deployed in place of the RST-REP 61. The RST-REP 61, having the same structure as that of the RST-REP 32 in FIG. 13 explained in the second embodiment, can select either one of two wavelengths λ1 and λ2.

FIG. 16 shows the internal structure of the regenerative repeater (RST/3R-REP) 62 proposed in the third embodiment.

In FIG. 16, an optical preamplifier 64 is a low-noise amplifier which amplifies an optical signal with the wavelength λ1 entered thereto. The amplified optical signal is split into two ways at an optical splitter 65. One part is sent to a 3R-REP functional unit 67, and the other part is supplied to an RST-REP functional unit 66. Although the original signal may be somewhat deteriorated, it will be regenerated by the RST-REP functional unit 66, whose internal structure is the same as the RST-REP 24 shown in FIG. 7 as part the first embodiment of the present invention. Besides regenerating the optical signal, the RST-REP functional unit 66 performs RSOH termination and insertion. Having almost the same internal structure as that of the 3R-REP functional unit 27 illustrated in FIG. 9 as part the first embodiment, the 3R-REP functional unit 67 only provides signal regeneration functions. It should be noted, however, that the signal regenerated by the 3R-REP functional unit 67 will have a different wavelength λ2 which is converted from the original wavelength λ1. The optical combiner 68 combines the regenerated optical signal with the wavelength λ1 sent from the RST-REP functional unit 66 and another regenerated optical signal with the wavelength λ2 sent from the 3R-REP functional unit 67, thereby multiplexing the two signals in the wavelength domain. The wavelength-division multiplexed signals are then delivered to an optical post-amplifier 69. The optical post-amplifier 69 amplifies the signals up to a certain power level.

FIG. 17 shows the internal structure of the RST/3R-REP 63. The optical signals with wavelengths λ1 and λ2 is entered to an optical preamplifier 70, which is a low-noise amplifier designed to amplify those wavelength-division multiplexed signals. The optical wavelength splitter 71 separates the multiplexed signals into two individual wavelength components, λ1 and λ2. The signal with the wavelength λ1 is then sent to an RST-REP functional unit 72, while the other signal with the wavelength λ2 is delivered to a 3R-REP functional unit 73.

The RST-REP functional unit 72, whose internal structure is the same as the RST-REP 24 shown in FIG. 7 as part the first embodiment of the present invention. Besides regenerating the optical signal, the RST-REP functional unit 72 performs RSOH termination and insertion. On the other hand, the 3R-REP functional unit 73 has the same internal structure as that of the 3R-REP functional unit 27 illustrated in FIG. 9 as part the first embodiment, and it only executes regeneration of the signal which may be deteriorated. An optical combiner 74 combines the regenerated optical signal with the wavelength λ1 sent from the RST-REP functional unit 72 and the other regenerated optical signal with the wavelength λ2 sent from the 3R-REP functional unit 73 into a single light beam. That is, the optical combiner 74 multiplexes the two signals in the wavelength domain. The wavelength-division multiplexed signals are then delivered to an optical post-amplifier 75 for further power amplification.

As described above, the third embodiment of the present invention places a 3R-REP in parallel with an RST-REP at one end or both ends of a linear repeater section. The 3R-REP provides signal regeneration functions, and the signal regenerated by this 3R-REP can be selected at a later stage on demand. Although the RSOH termination and insertion are not supported, the repeater can continuously provide a clear regenerated signal even if the RST-REP has failed due to some troubles. This configuration will introduce functional redundancy to the optical transmission system at a low cost and thus improves its reliability.

The fundamental elements of the third embodiment, whose concept was explained in FIG. 2, are implemented in the RST/3R-REPs 62 and 62 as follows. The first regenerative repeater means 5 in FIG. 3 corresponds to the RST-REP functional unit 66 in FIG. 16 or to the RST-REP functional unit 72 in FIG. 17. Likewise, the second regenerative repeater means 6 corresponds to the 3R-REP functional unit 67 in FIG. 16 or 73 in FIG. 17, and the wavelength-division multiplexing means 7 corresponds to the optical combiner 68 in FIG. 16 or 74 in FIG. 17.

Next, the following description will present a fourth embodiment of the present invention.

Figure 18:
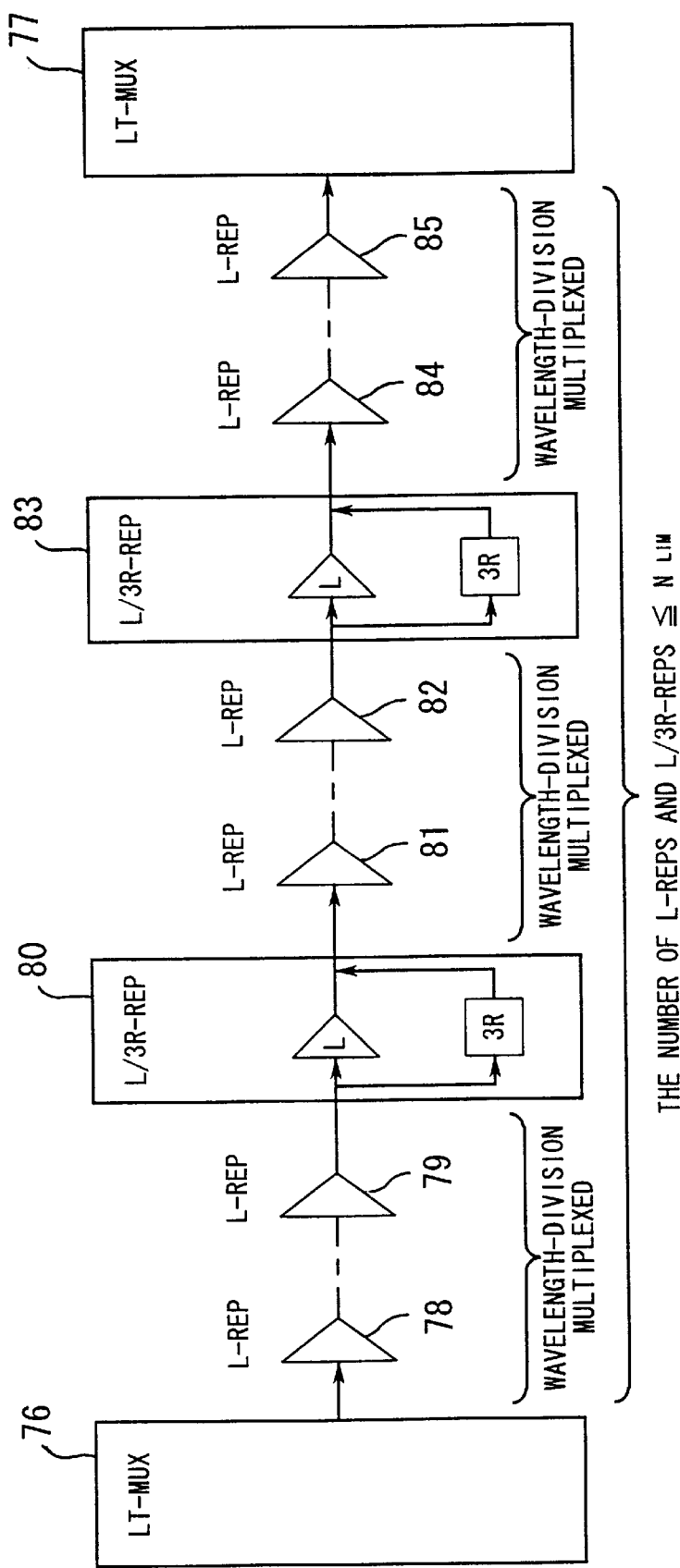
FIG. 18 is a diagram showing the structure of an optical communications system proposed in a fourth embodiment of the present invention.

FIG. 18 shows the structure of an optical communications system proposed in the fourth embodiment. The system of FIG. 18 has a linear repeater section connecting between two LT-MUXs 76 and 77. The linear repeater section comprises L-REPs 78–79, an L/3R-REP 80, L-REPs 81–82, an L/3R-REP 83, and L-REPs 84–85. The L/3R-REPs 80 and 83, as will be described in detail later on, are such devices that are equipped with both L-REP and 3R-REP functional units in parallel. The total number of repeaters that form the linear repeater section (i.e., including the L-REPs 78–79, L/3R-REP 80, L-REPs 81–82, L/3R-REP 83, and L-REPs 84–85) must not be greater than a predetermined number $N_{LIM}$. As mentioned in the first embodiment, the signals passing through the linear repeater section may suffer from some deterioration in signal-to-noise ratio (S/N) due to some optical noises introduced in the amplification processes. Transmission characteristics of the optical signals may also be degraded due to the wavelength dispersion. The number $N_{LIM}$ is determined so that such signal quality degradation will not exceed a predetermined tolerance level. The linear repeater section conveys a plurality of optical signals having different wavelengths (i.e., multiplexed in the wavelength domain) as will be described later on.

The L-REPs 78–79, 81–82, and 84–85 all have the same internal structure as that of the L-REP in FIG. 5 explained as part of the first embodiment. As alternate configurations, the LT-MUXs 76 and 77 can be replaced with RST-REPs or 3R-REPs.

Figure 19:
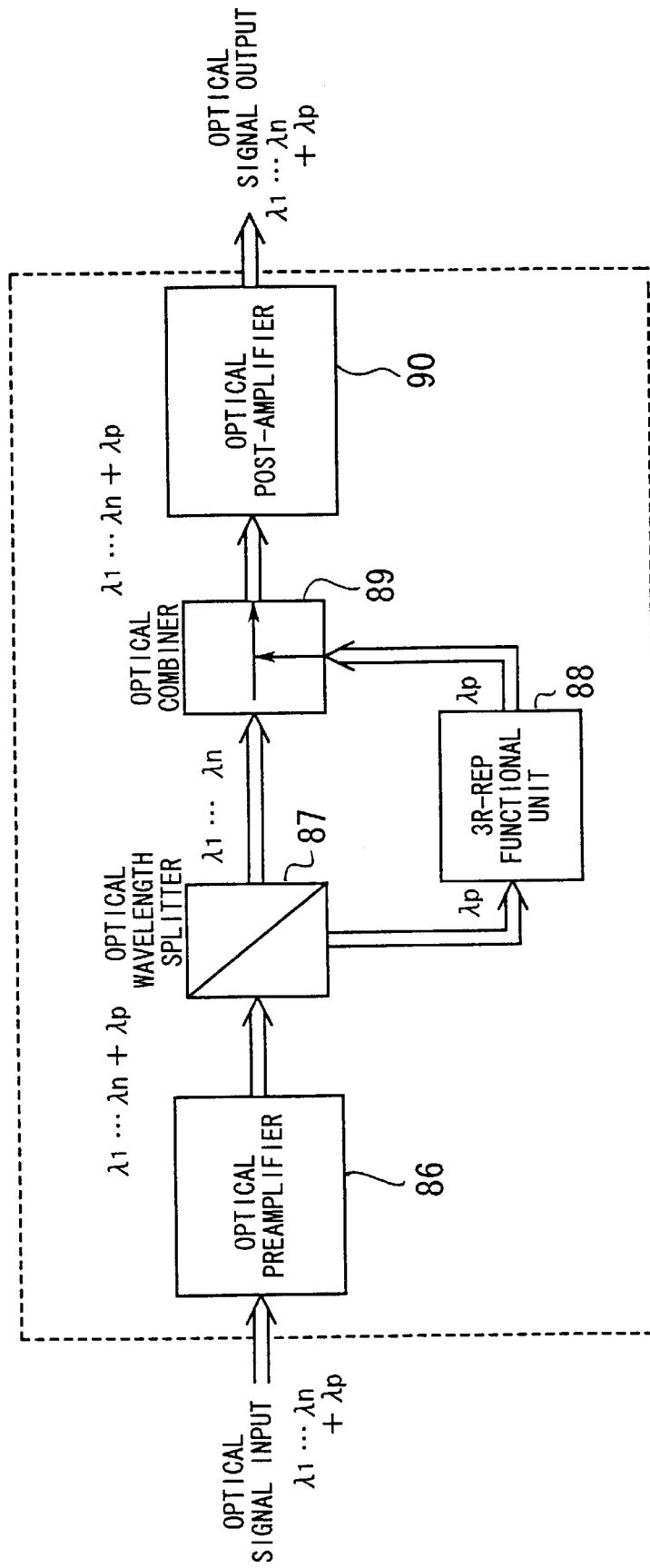
FIG. 19 is a diagram showing the internal structure of an L/3R-REP.

FIG. 19 shows the internal structure of the L/3R-REPs 80 and 83. The block diagram of FIG. 19 is applicable to both L/3R-REP units since they have exactly the same configuration.

Referring to FIG. 19, the wavelength-division multiplexed signals with a plurality of wavelengths λ1, λ2, ..., λn, and λp are entered to an optical preamplifier 86 for low-noise optical amplification. The optical wavelength splitter 87 splits the optical signal with wavelength λp off and sends it to a 3R-REP functional unit 88. The optical signal, which may be deteriorated, is refreshed by this 3R-REP functional unit 88, which has the same internal structure as that of the 3R-REP 27 illustrated in FIG. 9 as part the first embodiment of the present invention. The optical combiner 89 combines this regenerated optical signal having the wavelength λp sent from the 3R-REP functional unit 88 and the remaining optical signals with wavelengths λ1 to λn sent from the optical splitter 87. As such, the optical combiner 89 multiplexes again the optical signals and delivers them to an optical post-amplifier 90. The optical post-amplifier 90 further boosts the power of those multiplexed optical signals.

As explained in the second embodiment, the use of 3R-REPs in addition to L-REPs will provide higher reliability in the signal transmission over a linear repeater section, compared to the conventional systems with only L-REPs. The fourth embodiment devotes such 3R-REPs in the linear repeater sections and a particular optical resource with a wavelength λp to transmission of the most important information. This configuration will allow the prioritized information to be delivered to the destination without errors even in such bad situations where the other signals are suffering from bit errors.

As an alternate arrangement, it is possible to use this wavelength λp to convey the overhead control information of the other optical signals with wavelength λ1–λn separately from their main data part. Such a configuration will ensure the correct delivery of the overhead control information even when the transmission of the main data part failed.

As another alternate arrangement, the L/3R-REP can be configured so that a plurality of different waves will be assigned to the 3R-REP functional unit 88.

Next, a fifth embodiment of the present invention will be explained below.

The structure of the optical communications system of the fifth embodiment is the same as that of the fourth embodiment illustrated in FIG. 18 except for the internal structure of the L/3R-REPs 80 and 83. Therefore, the following description will focus on the interior of those L/3R-REPs.

Figure 20:
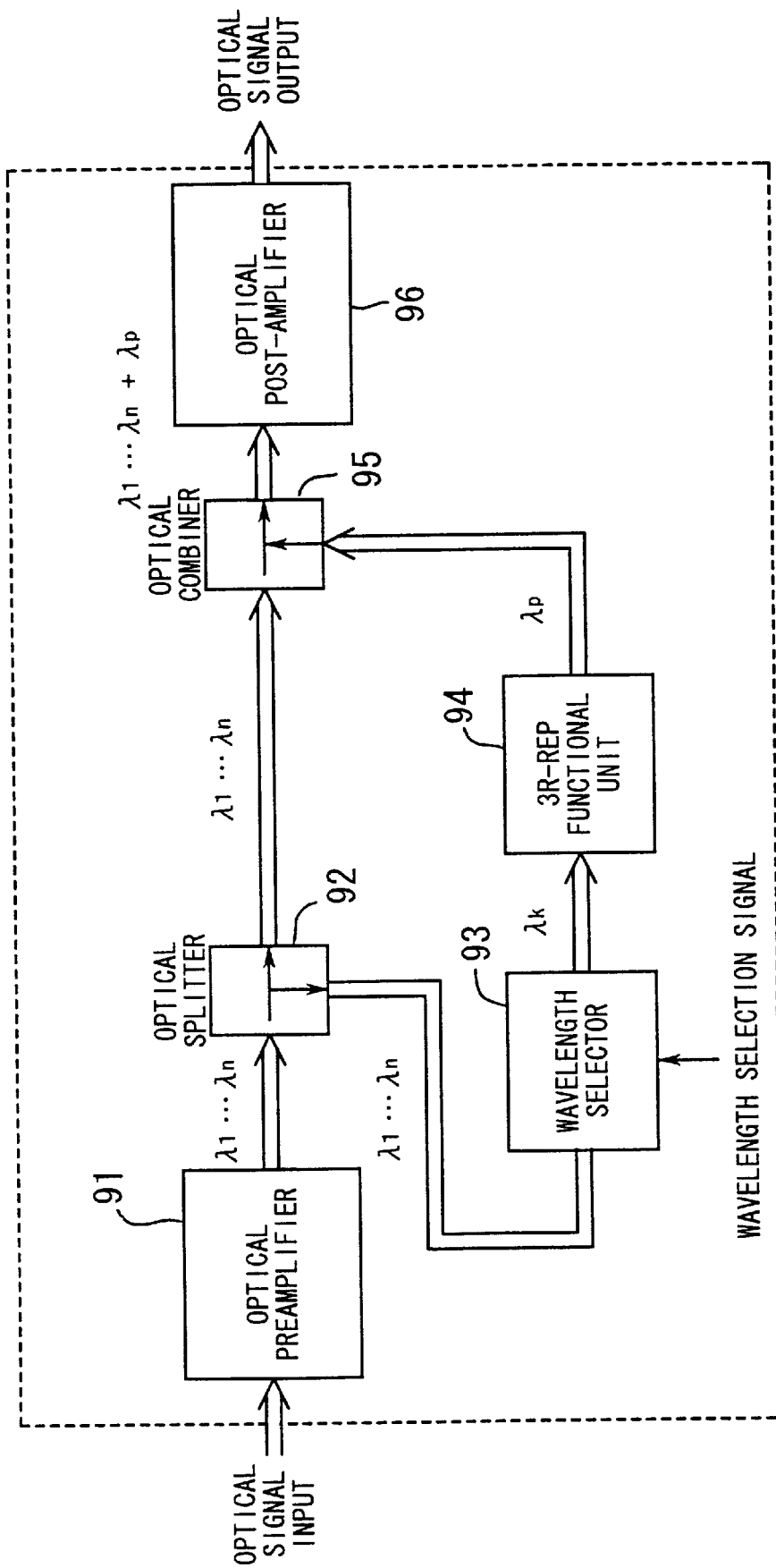
FIG. 20 is a diagram showing the internal structure of another type of L/3R-REP proposed in a fifth embodiment.

FIG. 20 shows the internal structure of an L/3R-REP proposed in the fifth embodiment. In FIG. 20, the wavelength-division multiplexed signals with a plurality of wavelengths λ1 to λn are entered to an optical preamplifier 91 to apply a low-noise optical amplification.

The amplified signals are split into two ways, one of which is supplied to a wavelength selector 93. With a wavelength selection signal controlled by an external source, the wavelength selector 93 selects one optical signal out of those supplied from the optical splitter 92 and sends the selected signal to a 3R-REP functional unit 94. Here, the wavelength λk of the selected signal is one of the plurality of wavelengths λ1 to λn. The 3R-REP functional unit 94, whose internal structure is almost the same as that of the 3R-REP illustrated in FIG. 9 as part the first embodiment of the present invention, refreshes the optical signal with the wavelength λk which is deteriorated. It should be noted here that the 3R-REP functional unit 94 changes the wavelength from λk to λp while regenerating the deteriorated optical signal, where λp is a new wavelength not included in the existing wavelengths λ1–λn. An optical combiner 95 combines this regenerated optical signal having the new wavelength λp sent from the 3R-REP functional unit 94 and the remaining optical signals with multiple wavelength λ1–λn sent from the optical splitter 92, and it delivers the combined optical signals to an optical post-amplifier 96. The optical post-amplifier 96 further boosts the power of the optical signals.

In the way described above, the fifth embodiment employs a wavelength selector that chooses a desired wavelength according to an external wavelength selection signal. The 3R-REP functional unit 94 regenerates the optical signal with the selected wavelength λk, thereby recovering the signal quality.

Although its diagram is not included the accompanying drawings, the fifth embodiment employs a device similar to the RST-REP shown in FIG. 13 to select either wavelength, λp or λk, at a later stage.

Next, the following description will present a sixth embodiment of the present invention.

Figure 21:
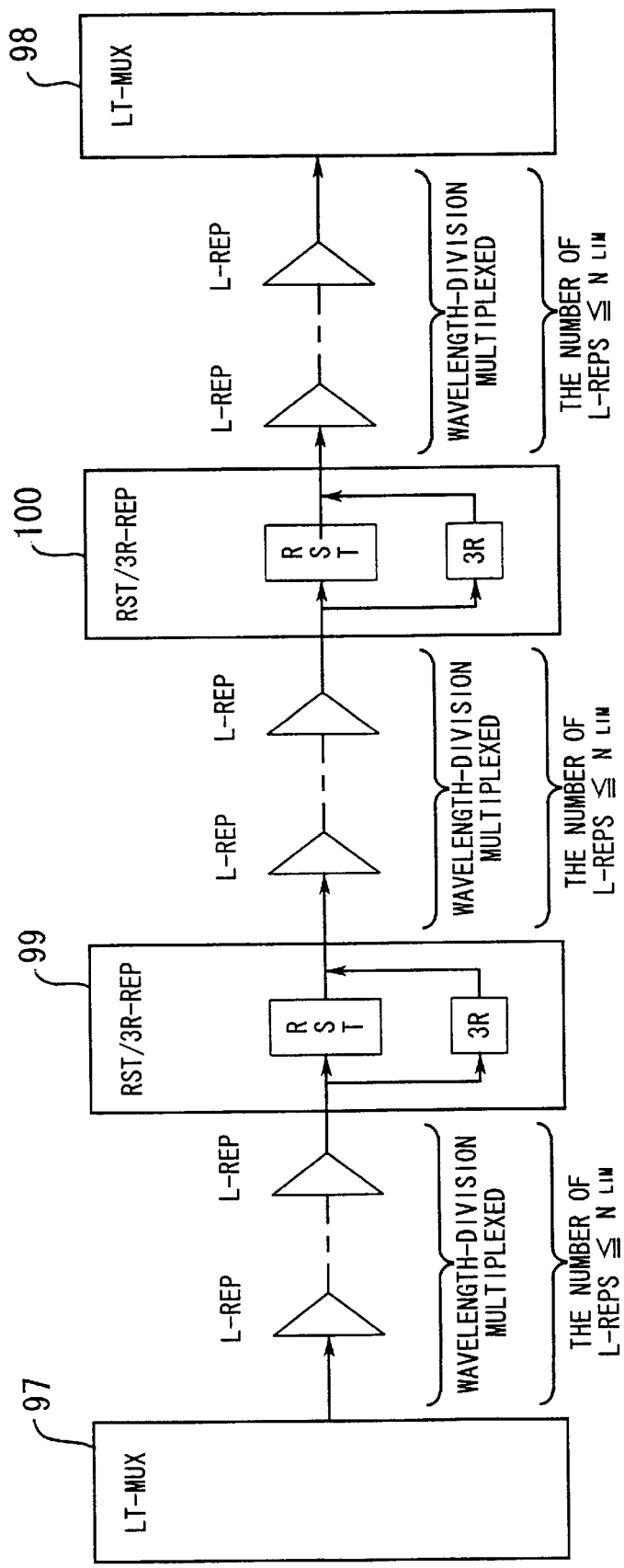
FIG. 21 is a diagram showing the structure of an optical communications system proposed in a sixth embodiment of the present invention.

FIG. 21 is a diagram showing the structure of an optical communications system proposed in this fifth embodiment. In FIG. 21, RST/3R-REPs 99 and 100 are deployed between two LT-MUXs 97 and 98. Those four devices are connected by three linear repeater sections each including a plurality of L-REPs, where the number of L-REPs in each linear repeater section is not greater than a predetermined number $N_{LIM}$. This number $N_{LIM}$ is determined in the same way as described in the first embodiment. The linear repeater sections convey a plurality of optical signals having different wavelengths (i.e., multiplexed in the wavelength domain). The L-REPs have the same internal structure as described in the first embodiment in FIG. 5. As an alternate configuration, the LT-MUXs 97 and 98 can be replaced with RST-REPs or 3R-REPs.

Figure 22:
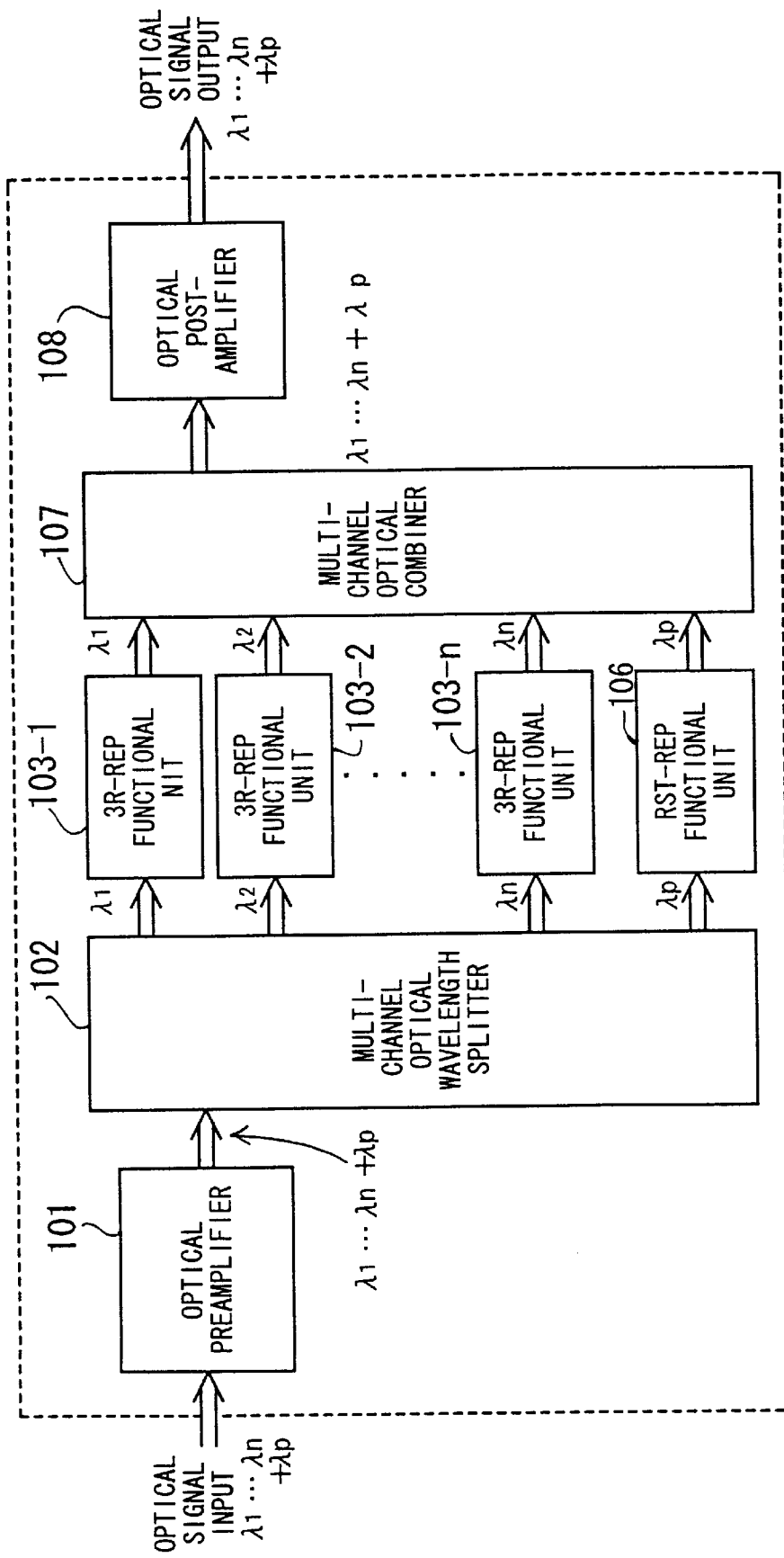
FIG. 22 is another diagram showing the internal structure of an RST/3R-REP.

FIG. 22 shows the internal structure of the RST/3R-REPs 99 and 100. Since the RST/3R-REPs 99 and 100 have the same structure, FIG. 22 illustrates only one instance.

The wavelength-division multiplexed signals with a plurality of wavelengths λ1, . . . , λn, and λp are entered to an optical preamplifier 101 prepared for low-noise optical amplification. The multi-channel optical wavelength splitter 102 splits the combined signals into separate optical signals and sends them to their respective repeater units. More specifically, FIG. 22 illustrates that the signals with wavelengths λ1 to λn are separately delivered to their dedicated 3R-REP functional units 103-1 to 103-n, respectively. Furthermore, the signal with a wavelength λp is supplied to another dedicated RST-REP functional unit 106.

The deteriorated optical signals are regenerated in the 3R-REP functional units 103-1 to 103-n, whose internal structure is the same as that of the 3R-REP functional unit 27 illustrated in FIG. 9 as part the first embodiment. The RST-REP functional unit 106, having the same internal structure as that of the RST-REP 24 shown in FIG. 7 as part the first embodiment, not only performs signal regeneration, but also executes RSOH termination and insertion. A multi-channel optical combiner 107 then combines those regenerated optical signals having a variety of wavelengths λ1–λn sent from the 3R-REP functional units 103-1 to 103-n, as well as λp from the RST-REP functional unit 106. As such, the multi-channel optical combiner 107 multiplexes all the signals into a single light beam and delivers it to an optical post-amplifier 90 for further power amplification.

In general, an optical transmission system that supports multiple communication channels does not always need to provide RSOH termination and insertion for every channel. Orderwire functions or data communication services, for instance, are available as part of the RSOH definitions. Practically, the RSOH of a single channel will provide sufficient capabilities for the system to enjoy those functions and services. Based on this idea, the sixth embodiment allocates the RST-REP functional unit 106 to a particular channel (i.e., the optical signal with a wavelength λp) for the special purpose, while repeating other channel signals (i.e., optical signals with wavelengths λ1–λn) by using simple 3R-REP functional units 103-1 to 103-n. Such a structural arrangement will simplify the most channels (λ1–λn) by eliminating RSOH termination and insertion, thereby achieving cost reduction of the optical transmission system.

Next, a seventh embodiment of the present invention will be explained below.

The structure of the optical communications system of the seventh embodiment is the same as that of the sixth embodiment illustrated in FIG. 21 except for the internal structure of the RST/3R-REPs 99 and 100. Thus the following description will focus on the interior of the RST/3R-REPs 99 and 100.

Figure 23:
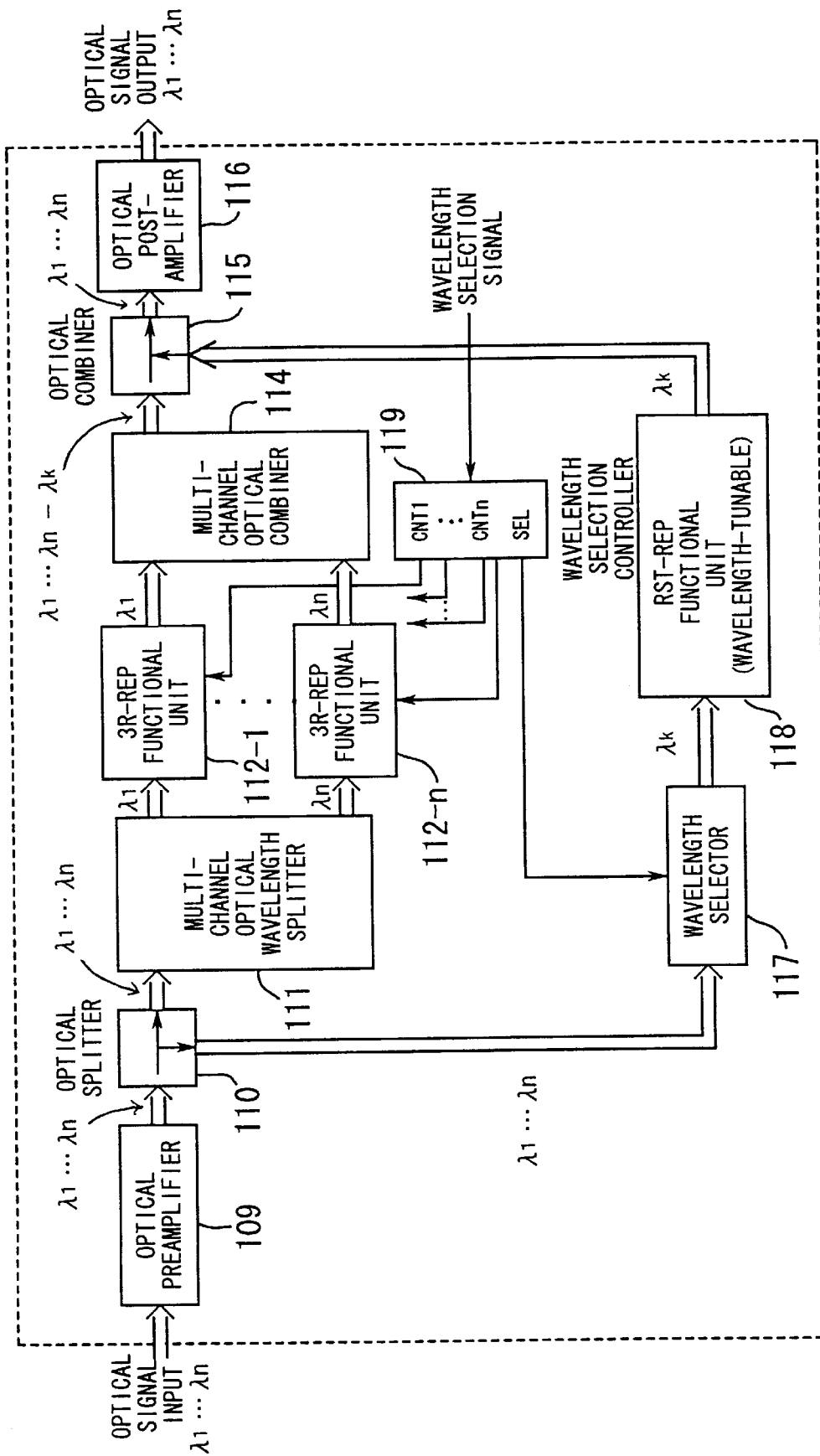
FIG. 23 is a diagram showing the internal structure of another type of RST/3R-REP proposed in a seventh embodiment.

FIG. 23 is a diagram showing the internal structure of an RST/3R-REP unit proposed in the seventh embodiment. In FIG. 23, the wavelength-division multiplexed signals with a plurality of wavelengths λ1 to λn are entered to an optical preamplifier 109 to apply a low-noise amplification. The amplified signals are first split into two parts, one of which is sent to a multi-channel optical wavelength splitter 111. The multi-channel optical wavelength splitter 111 further splits the multiplexed signals into individual signals and sends them to their respective 3R-REP functional units. More specifically, the signals with wavelengths λ1 to λn are separately delivered to the 3R-REP functional unit 112-1 to 112-n, respectively. The 3R-REP functional units 112-1 to 112-n, having the same internal structure as that of the 3R-REP 27 functional unit illustrated in FIG. 9 as part the first embodiment, regenerate each deteriorated optical signal supplied.

A multi-channel optical combiner 114 combines those regenerated optical signals with wavelengths λ1–λn sent from the 3R-REP functional units 112-1 to 112-n. The wavelength-division multiplexed signals are then sent to an optical combiner 115. Note here that one of the 3R-REP functional units 112-1 to 112-n is controlled not to output the regenerated optical signal having a particular wavelength, say λk, as will be described in detail later on. The optical combiner 115 further multiplexes a signal with the wavelength λp supplied from an RST-REP functional unit 118 (to be described later) and the optical signals multiplexed by the multi-channel optical combiner 114. As such, the multi-channel optical combiner 115 multiplexes all the signals into a single light beam and delivers it to an optical post-amplifier 116 for further power amplification.

On the other hand, the other part of the optical signals split at the optical splitter 110 is supplied to a wavelength selector 117. With a control signal SEL sent from a wavelength selection controller 119, the wavelength selector 117 selects one optical signal out of the signals with wavelengths λ1–λn and sends the selected signal to the RST-REP functional unit 118.

Besides executing the RSOH termination and insertion, the RST-REP functional unit 118 performs regeneration of the optical signal with the selected wavelength λk. Since this RST-REP functional unit 118 is a wavelength-tunable repeater, the regenerated signal will have the same wavelength λk even if it is changed to another frequency. The details of this RST-REP functional unit 118 will be described later on with reference to FIG. 24.

The wavelength selection controller 119 receives a wavelength selection signal from an external source that designates a particular wavelength λk. According to this wavelength selection signal, the wavelength selection controller 119 sends a control signal SEL that designates the wavelength λk to the wavelength selector 117. At the same time, the wavelength selection controller 119 generates signals CNT1 to CNTn to control the 3R-REP functional units 112-1 to 112-n, respectively. Here, the control signal CNTk, which is one of those control signals CNT1–CNTn, disables a particular 3R-REP functional unit 112-k that handles the wavelength λk, as opposed to the other control signals that enable their respective 3R-REP functional units. As a result, the multiplexed output of the multi-channel optical combiner 114 will include all wavelengths λ1–λn except for the particular wavelength λk that is designated by the external source. The wavelength λk excluded at this stage will join the multiplexed signals at the optical combiner 115, and thus its output will finally include all the original wavelengths λ1–λn.

As such, the seventh embodiment is different from the sixth embodiment in that it allows any optical signal to be subjected to the RSOH termination and insertion.

Figure 24:
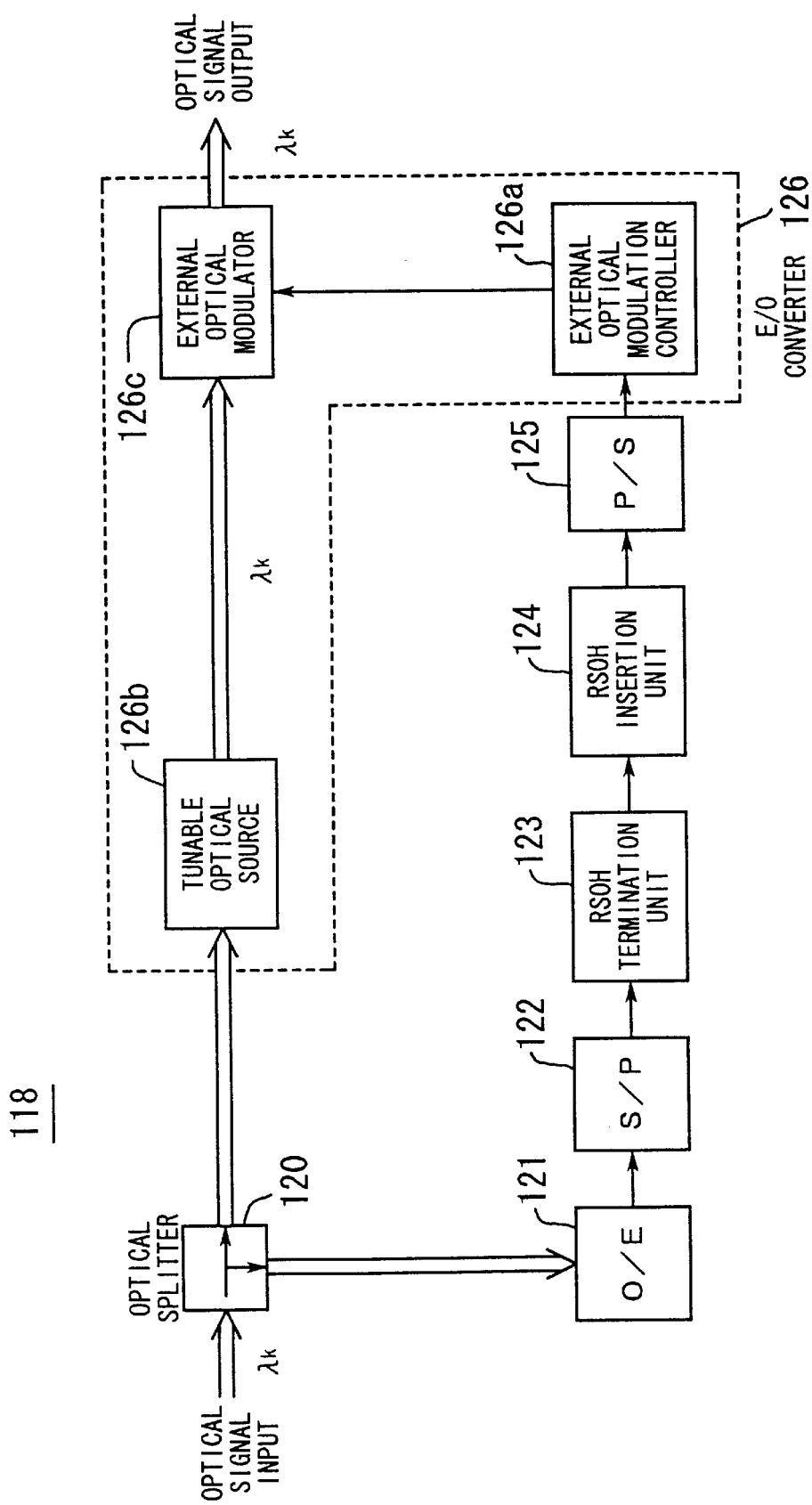
FIG. 24 is a diagram showing the internal structure of an RST-REP functional unit.
Figure 25:
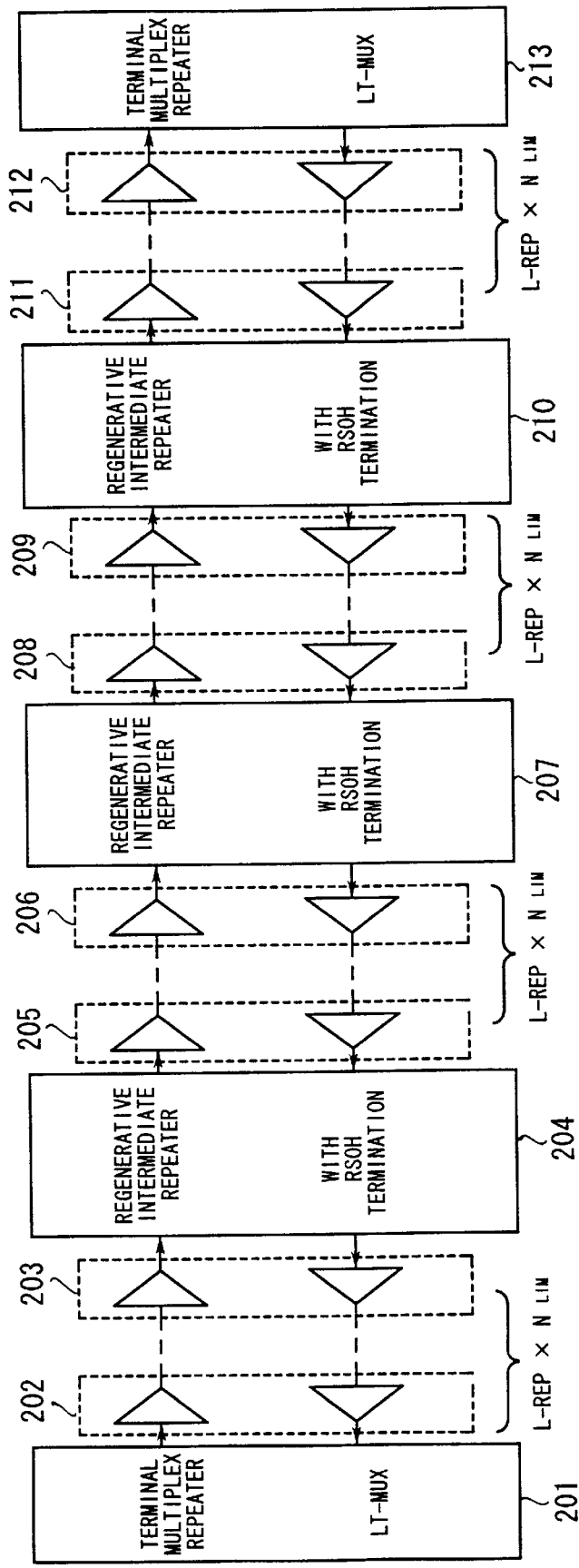
FIG. 25 is a diagram showing a typical configuration of an optical communications system that uses conventional linear optical repeaters (L-REPs).

FIG. 24 shows the internal structure of the RST-REP unit 118. Here, the optical input signal with a wavelength λk is split into two ways at an optical splitter 120; one is supplied to an optical-to-electrical (O/E) converter 121 and the other is sent to an electrical-to-optical (E/O) converter 126 indicated by the broken line in FIG. 24. The O/E converter 121 converts the optical signal to an electrical signal, regenerating the original information. A serial-to-parallel (S/P) converter 122 rearranges a serial bit stream to parallel data signals to allow the next stage to process the signals in a parallel manner at a lower speed. After that, an RSOH termination unit 123 and RSOH insertion unit 124 execute the RSOH termination and insertion processes, respectively, and a parallel-to-serial (P/S) converter 125 performs the inverse of what the S/P converter 122 did. The P/S converter 125 sends the electrical serial bit stream to an external optical modulation controller 126a in the E/O converter 126.

As part of the E/O converter 126, a tunable optical source 126b generates a light beam whose wavelength is adjusted exactly to the input light wavelength λk and supplies the generated light beam to an external optical modulator 126c. Under the control of the external optical modulation controller 126a, the external optical modulator 126c modulates the input light beam having the wavelength λk according to the electrical signal provided by the P/S converter 125, thereby outputting a modulated optical signal with the carrier wavelength λk.

The above discussion will be summarized as follows. According to the present invention, the RSOH termination and insertion are eliminated at one end of each linear repeater section where those processes are not required, while only a means for regenerating deteriorated optical signals is disposed at such an end. This elimination of unused elements will reduce the cost of the optical communication system.

Further, the present invention employs regenerative repeater means in parallel with linear optical amplification means (L-REP) at every few L-REP stages within a linear repeater section. Since the regenerative repeater means provides signal regeneration functions and the signal transported by using those regenerative repeaters can be selected at a later stage, it will be possible to compensate for signal deterioration even if it happened to the optical transmission signal due to some gradual degradation of noise factor NF or the like. Such an optical repeater configuration improves the reliability of the optical communications system.

Still further, the present invention employs second regenerative repeater means in parallel with first regenerative repeater means (RST-REP) at one end or both ends of a linear repeater section. The second regenerative repeater means provides signal regeneration functions and the signals output from this second regenerative repeater means can be selected at a later stage if necessary. Although the RSOH termination and insertion may not be fully supported, the repeater can continue to provide a clear regenerated signal even if the first regenerative repeater means failed due to some troubles. This structural arrangement introduces some functional redundancy at a low cost and thus improves the reliability of the optical transmission system.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission system having a linear repeater section that performs linear amplification of an optical signal, comprising:

linear optical amplification means, as part of the linear repeater section, for applying linear optical amplification to the optical signal that is entered thereto;

regenerative repeater means, disposed in parallel with said linear optical amplification means, for regenerating the optical signal; and wavelength-division multiplexing means for multiplexing the optical signal amplified by said linear optical amplification means and the optical signal regenerated by said regenerative repeater means in a wavelength domain to output wavelength-division multiplexed optical signals.

2. The optical transmission system according to claim 1, further comprising:

wavelength splitting means, coupled to said wavelength-division multiplexing means, for splitting the wavelength-division multiplexed optical signals into two individual optical signals, error monitoring status detecting means, coupled to said splitting means, for performing termination of the RSOH and detecting error monitoring status for each of the two individual optical signals, and selecting means for selecting either one of the two individual optical signals split by said splitting means, based upon the error monitoring status detected by said error monitoring status detecting means.

3. An optical repeater device for an optical transmission system, which is used in a linear repeater section that performs linear amplification of a single-wavelength optical signal, comprising:

linear optical amplification means for applying linear optical amplification to a first optical signal with a first wavelength that is entered thereto;

regenerative repeater means, disposed in parallel with said linear optical amplification means, for regenerating the first optical signal and converting the first wavelength to a second wavelength to produce a second optical signal; and wavelength-division multiplexing means for multiplexing the first optical signal amplified by said linear optical amplification means and the second optical signal produced by said regenerative repeater means in a wavelength domain.

4. An optical repeater device for an optical transmission system, which is used in a linear repeater section that performs linear amplification of wavelength-division multiplexed optical signals including a first optical signal with a first wavelength and a second a second optical signal with a second wavelength, comprising:

linear optical amplification means for applying linear optical amplification to the wavelength-division multiplexed optical signals;

wavelength splitting means for extracting the first and second optical signals by splitting in a wavelength domain the wavelength-division multiplexed optical signals amplified by said linear optical amplification means;

regenerative repeater means for regenerating the second optical signal extracted by said wavelength splitting means, with the second wavelength maintained; and wavelength-division multiplexing means for multiplexing, in the wavelength domain, the first optical signal extracted by said wavelength splitting means and the second optical signal regenerated by said regenerative repeater means.

5. An optical transmission system having a linear repeater section that performs linear amplification of an optical signal, comprising:

first regenerative repeater means, connected to at least one end of the linear repeater section, for producing a first optical signal by regenerating an optical signal that is entered thereto and performing RSOH termination and insertion for the regenerated optical signal;

second regenerative repeater means, disposed in parallel with said first regenerative repeater means, for producing a second optical signal by regenerating the optical signal that is entered;

wavelength-division multiplexing means for multiplexing the first optical signal produced by said first regenerative repeater means and the second optical signal produced by said regenerative repeater means in a wavelength domain to output wavelength-division multiplexed optical signals;

wavelength splitting means for obtaining the first and second optical signals by splitting in the wavelength domain the wavelength-division multiplexed optical signals sent from said wavelength-division multiplexing means;

error monitoring status detecting means, coupled to said wavelength splitting means, for performing RSOH termination to detect error monitoring status concerning each of the first and second optical signals; and selecting means for selecting either one of the first and second optical signals obtained by said wavelength splitting means, based on the error monitoring status detected by said error monitoring status detecting means.

6. An optical repeater device for an optical transmission system, which is connected to at least one end of a linear repeater section that performs linear amplification of a single-wavelength optical signal, said optical repeater device comprising:

first regenerative repeater means for producing a first optical signal with a first wavelength by regenerating an optical signal that is entered thereto and by applying RSOH termination and insertion to the optical signal regenerated;

second regenerative repeater means, disposed in parallel with said first regenerative repeater means, for producing a second optical signal with a second wavelength that is different from the first wavelength by regenerating the optical signal that is entered thereto and by making a wavelength conversion from the first wavelength to the second wavelength; and wavelength-division multiplexing means for multiplexing the first optical signal produced by said first regenerative repeater means and the second optical signal produced by said regenerative repeater means in a wavelength domain to output wavelength-division multiplexed optical signals.

7. An optical repeater device for an optical transmission system, which is connected to at least one end of linear repeater section that performs linear amplification of wavelength-division multiplexed optical signals including a first optical signal with a first wavelength and a second a second optical signal with a second wavelength, comprising:

wavelength splitting means, coupled to said wavelength-division multiplexing means, for obtaining the first and second optical signals by splitting the wavelength-division multiplexed optical signal in the wavelength domain;

first regenerative repeater means for regenerating the first optical signal obtained by said wavelength splitting means and applying RSOH termination and insertion to the first optical signal regenerated;

second regenerative repeater means for regenerating the second optical signal obtained by said wavelength splitting means, while maintaining the second wavelength unchanged; and wavelength-division multiplexing means for multiplexing the first optical signal regenerated by said first regenerative repeater means and the second optical signal regenerated by said second regenerative repeater means in a wavelength domain.

8. An optical transmission system having a linear repeater section that performs linear amplification of wavelength-division multiplexed optical signals including a plurality of optical signals with different wavelengths, comprising:

linear optical amplification means, disposed as part of the linear repeater section, for applying linear optical amplification to the wavelength-division multiplexed optical signals that are entered thereto;

splitting means for splitting the wavelength-division multiplexed optical signals into a first and second groups of optical signals;

selection means for selecting an optical signal having a particular wavelength from among the second group of optical signals;

regenerative repeater means for regenerating the optical signal selected by said selection means while converting a wavelength thereof to another wavelength; and wavelength-division multiplexing means for multiplexing, in a wavelength domain, the first group of optical signals split by said splitting means and the selected optical signal provided by said regenerative repeater means.

9. An optical repeater device for an optical transmission system, which is disposed in a linear repeater section that performs linear amplification of wavelength-division multiplexed optical signals including a plurality of optical signals with different wavelengths, comprising:

linear optical amplification means for applying linear optical amplification to the wavelength-division multiplexed optical signals that are entered thereto;

splitting means for splitting the wavelength-division multiplexed optical signals amplified by said linear optical amplification means into a first and second groups of optical signals;

selection means for selecting an optical signal having a particular wavelength from among the second group of optical signals;

regenerative repeater means for regenerating the optical signal selected by said selection means while converting a wavelength thereof to another wavelength; and wavelength-division multiplexing means for multiplexing, in a wavelength domain, the first group of optical signals split by said splitting means and the selected optical signal provided by said regenerative repeater means.

10. An optical repeater device for an optical transmission system, which is connected to at least one end of a linear repeater section that performs linear amplification of wavelength-division multiplexed optical signals including a plurality of optical signals with different wavelengths, comprising:

wavelength splitting means, connected to at least one end of the linear repeater section, for splitting in a wavelength domain the wavelength-division multiplexed optical signals into the individual optical signals;

first regenerative repeater means for individually regenerating the optical signals split by said wavelength splitting means;

selection means, disposed at the same end of the linear repeater section as said wavelength splitting means is disposed, for selecting one of the optical signals having a particular wavelength from among the wavelength-division multiplexed optical signals;

second regenerative repeater means for regenerating the optical signal selected by said selection means and applying RSOH termination and insertion to the selected optical signal regenerated; and wavelength-division multiplexing means for multiplexing, in the wavelength domain, the optical signals processed by said first regenerative repeater means, excluding the optical signal with the particular wavelength, and the optical signal with the particular wavelength processed by said second regenerative repeater means.

* * * * *